US 12,049,067 B2

(12) United States Patent
Park

(10) Patent No.: US 12,049,067 B2
(45) Date of Patent: Jul. 30, 2024

(54) LAMINATION DEVICE

(71) Applicant: SAMSUNG DISPLAY CO., LTD., Yongin-si (KR)

(72) Inventor: Junsu Park, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 273 days.

(21) Appl. No.: 17/648,633

(22) Filed: Jan. 21, 2022

(65) Prior Publication Data
US 2022/0324216 A1 Oct. 13, 2022

(30) Foreign Application Priority Data

Apr. 8, 2021 (KR) .................. 10-2021-0045977

(51) Int. Cl.
B32B 37/00 (2006.01)
B32B 37/10 (2006.01)
B32B 38/18 (2006.01)
(52) U.S. Cl.
CPC .......... B32B 37/0046 (2013.01); B32B 37/10 (2013.01); B32B 38/1833 (2013.01); B32B 38/1866 (2013.01); B32B 2457/202 (2013.01)
(58) Field of Classification Search
CPC .............. B32B 37/0046; B32B 37/003; B32B 38/1866; B32B 41/00; Y10T 156/1028; B29C 66/90; B29C 66/92–92211; B29C 66/924–9241; B30B 15/14; B30B 15/148; B30B 15/16–26
See application file for complete search history.

(56) References Cited

U.S. PATENT DOCUMENTS

| 10,518,515 B2 | 12/2019 | Choi et al. |
| 10,741,766 B2 | 8/2020 | Chung et al. |
| 2016/0136937 A1* | 5/2016 | Sung .................. B32B 37/1009 156/64 |
| 2018/0056638 A1* | 3/2018 | Choi .................. B32B 38/1808 |

FOREIGN PATENT DOCUMENTS

| KR | 101617920 | 5/2016 |
| KR | 20170128135 | 11/2017 |
| KR | 101825513 | 3/2018 |
| KR | 101825513 B1 * | 3/2018 |
| KR | 20180025429 | 3/2018 |

* cited by examiner

Primary Examiner — Carson Gross
(74) Attorney, Agent, or Firm — F. CHAU & ASSOCIATES, LLC

(57) ABSTRACT

A lamination device includes a first jig to which is fixed a window that includes a flat surface and at least one curved surface, a pressure pad disposed on a second jig that faces the first jig, where the pressure pad includes a first surface that corresponds the flat surface of the window and a second surface that corresponds the at least one curved surface of the window, and a pressure sensor array disposed on the pressure pad. The pressure sensor array includes a plurality of first electrodes that overlap the first surface and a plurality of second electrodes that overlap the second surface.

20 Claims, 19 Drawing Sheets

LAMINATION DEVICE

CROSS-REFERENCE TO RELATED APPLICATION

This U.S. nonprovisional application claims priority under 35 U.S.C § 119 from Korean Patent Application No. 10-2021-0045977, filed on Apr. 8, 2021 in the Korean Intellectual Property Office, the contents of which are herein incorporated by reference in their entirety.

BACKGROUND

Technical Field

Embodiments of the present disclosure are directed to a lamination device, and more particularly, to a lamination device that includes a pressure sensor array.

Discussion of the Related Art

In general, a cover window is adhered to a front surface of a display panel to protect the display panel. In this case, the display panel and the cover window are adhered to each other through an adhesive interposed therebetween.

A side-view display device has been recently developed that includes a main display region in which a main image is displayed and an auxiliary display region on a curved lateral side in which a sub-image is displayed. The cover window for the side-view display device has a side-curved structure in which a lateral side of the cover window is curved.

SUMMARY

Embodiments of the present disclosure provide a lamination device that includes a pressure sensor array capable of independently distinguishing and measuring pressures at their own locations.

According to an embodiment of the present disclosure, a lamination device comprises: a first jig to which is fixed a window, where the window includes a flat surface and at least one curved surface; a pressure pad on a second jig that faces the first jig, where the pressure pad includes a first surface that overlaps the flat surface of the window and a second surface that overlaps the at least one curved surface of the window; and a pressure sensor array disposed on the pressure pad. The pressure sensor array may include: a plurality of first electrodes that overlap the first surface; and a plurality of second electrodes that overlap the second surface.

In an embodiment, the lamination device further comprises a panel interposed between the window and the pressure pad.

In an embodiment, the pressure pad includes: a top surface that is convex toward the window; and a depression that is inwardly recessed from a lateral surface of the pressure pad. The first and second surfaces of the pressure pad are located on the top surface of the pressure pad.

In an embodiment, the pressure sensor array includes a stretchable substrate. The first electrodes and the second electrodes are disposed on one surface of the stretchable substrate.

In an embodiment, the stretchable substrate includes a polymer thin film.

In an embodiment, the lamination device further includes an adhesive member interposed between the stretchable substrate and the pressure pad.

In an embodiment, the pressure sensor array further includes a support substrate disposed on the one surface of the stretchable substrate. The support substrate covers the first electrodes and the second electrodes. The support substrate includes a same material as that of the pressure pad.

In an embodiment, a modulus of the second electrodes is less than a modulus of the first electrodes.

In an embodiment, a size of each of the first electrodes differs from a size of each of the second electrodes.

In an embodiment, the pressure sensor array includes a first stretchable substrate and a second stretchable substrate disposed on the first stretchable substrate. The first electrodes and the second electrodes are disposed between the first stretchable substrate and the second stretchable substrate.

According to an embodiment of the present disclosure, a lamination device comprises: a first jig to which is fixed a window that includes a curved surface; a second jig that faces the first jig, where the second jig includes a pressure pad and the pressure pad includes a top surface that overlaps the window; and a pressure sensor array disposed on a portion of the pressure pad that overlaps the curved surface of the window, where the pressure sensor array includes a plurality of electrodes.

In an embodiment, the curved surface includes a first curved surface and a second curved surface. The pressure sensor array includes: a first electrode disposed on the first curved surface; and a second electrode disposed on the second curved surface.

In an embodiment, the pressure sensor array includes a stretchable substrate. The first electrode and the second electrode are disposed on the stretchable substrate.

In an embodiment, the pressure sensor array further includes a support substrate disposed on the stretchable substrate. A thickness of the support substrate is greater than a thickness of the stretchable substrate.

In an embodiment, the stretchable substrate includes a polymer thin film.

In an embodiment, the plurality of electrodes are disposed at different positions and detect pressures whose magnitudes differ from each other.

According to an embodiment of the present disclosure, a lamination device comprises: a first jig to which a window is fixed; a pressure pad disposed on a second jig that faces the first jig; and a pressure sensor array attached to a top surface of the pressure pad. The pressure sensor array includes a plurality of electrodes disposed at different positions on the top surface of the pressure pad. The plurality of electrodes detect different pressures applied to the different positions.

In an embodiment, the window includes a flat surface and a curved surface that surrounds the flat surface. The plurality of electrodes include a plurality of first electrodes disposed on the flat surface and a plurality of second electrodes disposed on the curved surface.

In an embodiment, a modulus of the second electrodes is less than a modulus of the first electrodes.

In an embodiment, the lamination device further includes a controller that controls in real-time the different pressures applied to the pressure pad, based on the detected different pressures.

In an embodiment, the controller controls a movement of the first jig or the second jig, based on the detected different pressures.

According to an embodiment of the present disclosure, a method of operating of a lamination device includes the steps of: detecting, by a plurality of electrodes disposed at different positions on a pressure pad of the lamination device, different pressures applied to the plurality of electrodes; converting, by a controller, the detected different pressures into digital data in real-time, and analyzing the digital data using artificial intelligence; and controlling, by the controller, an operation of a lamination device in real-time based on the digital data related to the detected different pressures, wherein the controller controls movement of a first jig or a second jig of the lamination device and adjusts the different pressures applied to the pressure pad.

DETAILED DESCRIPTION OF EMBODIMENTS

In this description, when a certain component, or region, layer, portion, etc., is referred to as being "on", "connected to", or "coupled to" other component(s), the certain component may be directly on, directly connected to, or directly coupled to the other component(s) or at least one intervening component may be present therebetween.

Like numerals may indicate like components.

The following will now describe some embodiments of the present disclosure in conjunction with the accompanying drawings.

Figure 1:
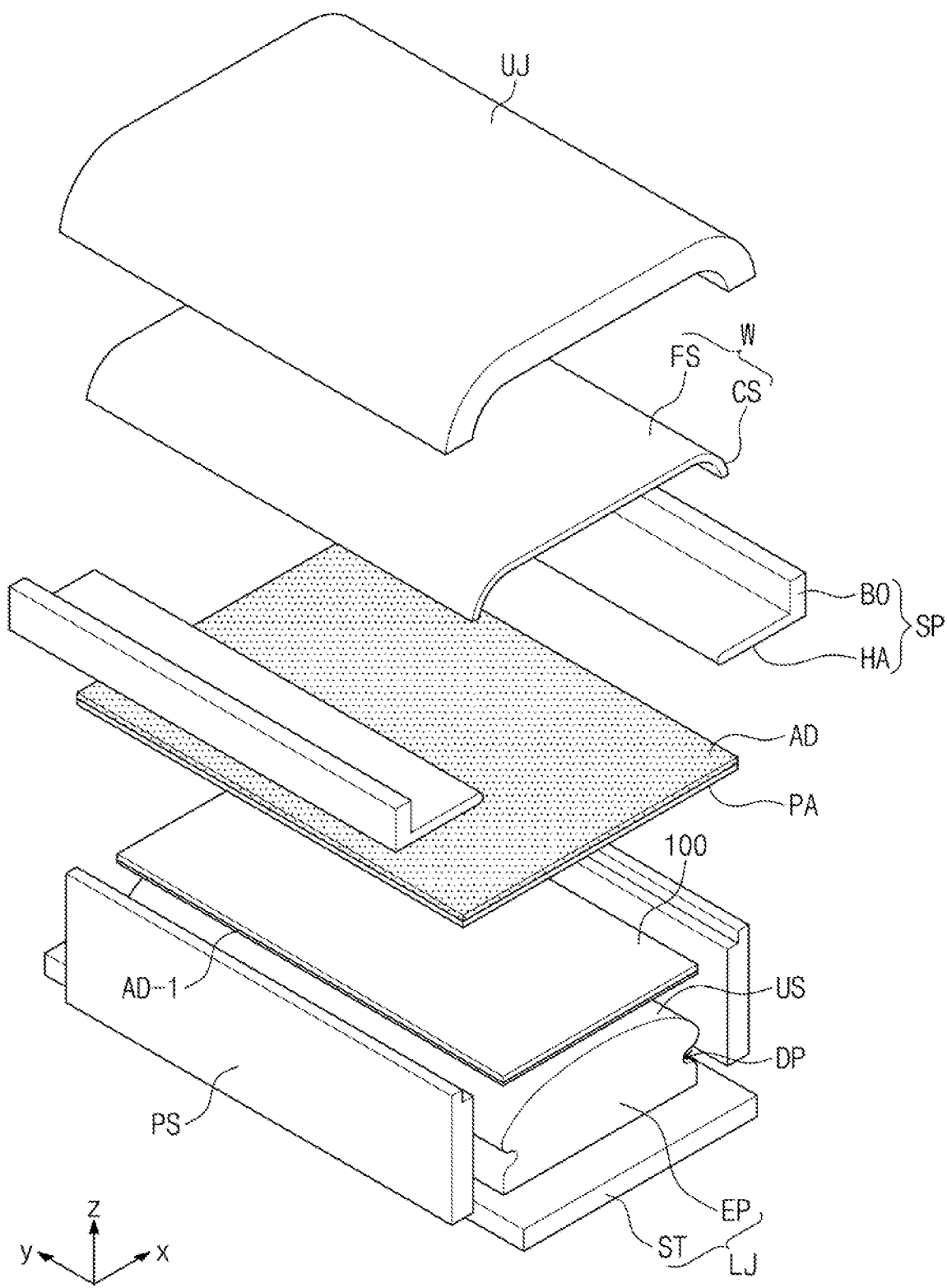
FIG. 1 is a perspective view of a lamination device according to an embodiment of the present disclosure.
Figure 2:
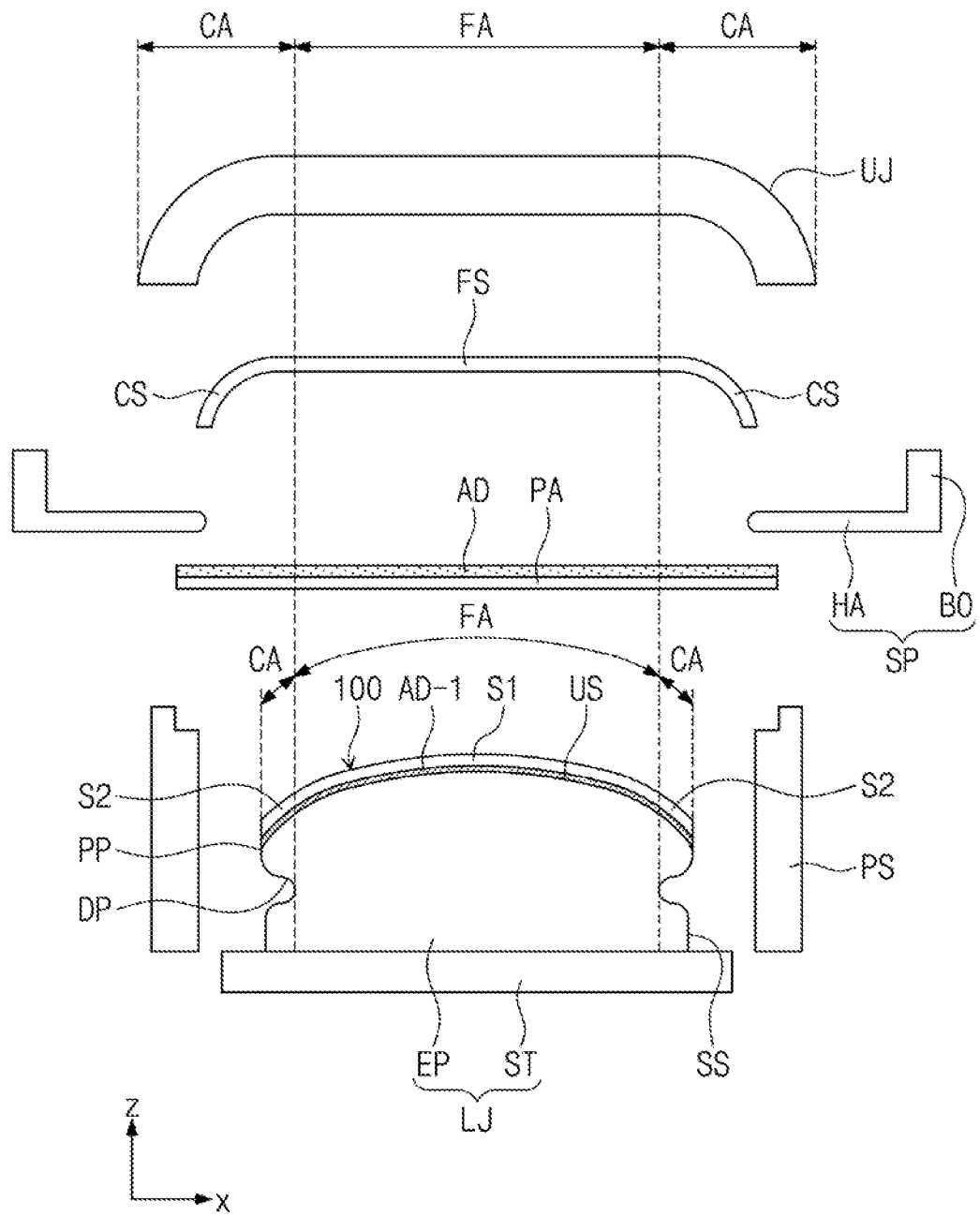
FIG. 2 is a cross-sectional view of a lamination device according to an embodiment of the present disclosure.

FIG. 1 is an exploded perspective view of a lamination device according to an embodiment of the present disclosure. FIG. 2 of a cross-sectional view of the lamination device according to an embodiment of FIG. 1.

Referring to FIGS. 1 and 2, a lamination device according to an embodiment of the present disclosure includes a first jig UJ that fixes a window W, and also includes a second jig LJ that faces the first jig UJ and includes a pressure pad EP that has a top surface US that is convex toward the first jig UJ and a depression DP recessed inward from a lateral surface SS.

The first jig UJ can rigidly place the window W in position. In an embodiment, the first jig UJ uses a vacuum adsorption method or an adhesion method to fix the window W.

In an embodiment, the first jig UJ is an upper jig disposed on an upper side of the lamination device. However, embodiments are not limited thereto, and in other embodiments, the first jig UJ is a lower jig disposed on a lower side of the lamination device. The first jig UJ has a shape that conforms to that of the window W where it makes contact with the window W. For example, when the window W has a flat surface and a curved surface, the first jig UJ includes a flat surface part and a curved surface part that respectively correspond to the flat surface and the curved surface of the window W. In an embodiment, the window W has a flat surface FS and a curved surface CS disposed on opposite sides of the flat surface FS, and the first jig UJ includes a flat surface part and a curved surface part that respectively correspond to the flat surface FS and the curved surface CS of the window W.

In an embodiment, the first jig UJ can move up and down. For example, as shown, the first jig UJ can move in a positive or negative direction along a z-axis.

In an embodiment, the window W is formed of transparent glass or plastic. For example, the window W includes an optically transmissive material In an embodiment, the window W is flexible. For example, the window W is formed of a bendable, foldable, or rollable material or structure, and is thus bendable, foldable, or rollable.

In an embodiment, a top surface of the window W is in contact with the first jig UJ, and thus the window W is fixed to the first jig UJ. The window W includes the curved surface CS at least in part. This will be further described in detail in FIGS. 4 and 5.

In an embodiment, a stopper SP is disposed on opposite sides of the window W. The stopper SP is disposed between an end of the window W and an end of a panel PA to subsequently guide adhesion between the window W and the panel PA. The panel PA is interposed between the window W and the pressure pad EP. The following will describe a detailed operation of the stopper SP.

In an embodiment, the stopper SP has a bar shape and extends in a longitudinal direction. In an embodiment in which the window W has curved surfaces CS that extend in a longitudinal direction, the stopper SP extends in the longitudinal direction like the curved surface CS of the window W. For example, the position of the stopper SP corresponds to the curved surface CS of the window W.

In an embodiment, the stopper SP can move in a horizontal direction that is substantially perpendicular to the longitudinal direction. In an embodiment, the stopper SP can move in a positive or negative direction along an x-axis. For example, two stoppers SP can move in a direction away from each other or toward each other.

In an embodiment, the stopper SP includes a body BO and a handle HA that extends from the body BO, and has an "L" shape in the cross-sectional view of FIG. 2. The handle HA is less thick than the body BO. In the following, the handle HA is interposed between the window W and the panel PA, and thus can guide adhesion between the window W and the panel PA.

In an embodiment, the handle HA is curved at an end thereof. For example, the end of the handle HA has a curved surface for at least in part of its outer circumference. When the end of the handle HA is curved, as discussed below, a contact area between the stopper SP and the panel PA and/or between the stopper SP and an adhesive layer AD can be minimized to prevent contact-induced sliding or friction.

The second jig LJ faces the first jig UJ. In an embodiment, the second jig LJ is a lower jig disposed below the first jig UJ. For convenience of description, an example is described in which the first jig UJ forms an upper side of the lamination device and the second jig LJ forms a lower side of the lamination device, but embodiments of the present disclosure are not limited thereto. For example, in other embodiments, the first jig UJ forms a lower side, and the second jig LJ forms an upper side.

In an embodiment, the second jig LJ includes a stage ST and a pressure pad EP disposed on the stage ST. The stage ST provides a surface on which the pressure pad EP is disposed. The stage ST can move up and down. For example, the stage ST can move in a positive or negative direction along the z-axis depicted in FIGS. 1 and 2.

The up-and-down movement of the stage ST moves the pressure pad EP up and down.

In an embodiment, the pressure pad EP is disposed on the stage ST. In an embodiment, the pressure pad EP is connected with the stage ST. In another embodiment, the pressure pad EP and the stage ST are integrally formed and made of the same material.

In an embodiment, the pressure pad EP is resilient and at least partially deformable. The pressure pad EP is formed of an elastic material. For example, the pressure pad EP is formed of at least one of urethane, rubber, or a synthetic resin. However, no limitation is imposed on the material of the pressure pad EP, and any elastic material can be used as the material of the pressure pad EP.

In an embodiment, the pressure pad EP is formed as a single piece. For example, the pressure pad EP is formed of a single material.

In an embodiment, the pressure pad EP has a uniform density throughout the whole pad. For example, the pressure pad EP has the same mass of resilient material per unit volume at every portion, such as inner and outer sides or one and other locations.

When the density of the pressure pad EP is entirely uniform, as disclosed above, a magnitude of pressure applied to the pressure pad EP depends only on outward appearance of the pressure pad EP.

The outward appearance of the pressure pad EP will be further described below in detail with reference to FIG. 5.

In an embodiment, the depression DP may be formed in at least one side of the pressure pad EP. In an embodiment, the depression DP is formed in opposite sides of the pressure pad EP.

In an embodiment, the depression DP extends in a longitudinal direction. For example, the depression DP extends in a y-axis direction depicted in FIG. 1.

In an embodiment, like the curved surface CS of the window W, the depression DP extends in a longitudinal direction. For example, the location of the depression DP corresponds to the curved surface CS of the window W.

In an embodiment, one or more panel supporters PS are disposed on opposite sides of the second jig LJ. The panel supporters PS support opposite sides of the panel PA, which will be described below. The panel PA is disposed between the pressure pad EP and the window W. In an embodiment, the panel supporter PS can move in a positive or negative x-axis direction depicted in FIGS. 1 and 2.

For example, in an embodiment, the panel supporters PS can move in a direction toward each other or away from each other. As described below, when the panel supporters PS approach each other while supporting opposite sides of the panel PA, the panel PA may bend into an arch shape.

In an embodiment, the panel PA may be a display panel or touch screen panel, each of which can be used for a display device. In another embodiment, the panel PA is a touch unit. However, embodiments of the present disclosure are not limited thereto, and in this description, the panel PA may be interpreted in its broadest sense. For example, the panel PA may include a plate-shaped member.

In an embodiment, the adhesive layer AD is disposed on the panel PA. The adhesive layer AD is interposed between the window W and the panel PA, and thus attaches the window W and the panel PA to each other.

In an embodiment, the adhesive layer AD includes a photo-curable or thermo-curable resin that is adhesive and transmits light. For example, a resin such as an acrylic resin is coated on the panel and then ultraviolet-cured to form the adhesive layer AD.

In another embodiment, the adhesive layer AD includes an optically clear adhesive (OCA).

The figures illustrate an example in which the adhesive layer AD completely covers the panel PA, but in another embodiment, the adhesive layer AD at least partially covers the panel PA.

For convenience of description, an example will be described in which the adhesive layer AD is formed on the panel PA, but embodiments of the present disclosure are not limited thereto. For example, in another embodiment, the adhesive layer AD is formed below the window W.

In an embodiment, a pressure sensor array 100 is disposed between the panel PA and the pressure pad EP. The pressure sensor array 100 is placed on the pressure pad EP. An adhesive member AD-1 is disposed between the pressure sensor array 100 and the pressure pad EP. For example, an adhesive member AD-1 attaches the pressure sensor array 100 to the pressure pad EP. The description of the adhesive layer AD is substantially applicable to the adhesive member AD-1. For example, the adhesive member AD-1 includes the same adhesive as the adhesive layer AD. The adhesive member AD-1 may include a stretchable material.

The pressure pad EP and the pressure sensor array 100 disposed on the pressure pad EP will be described with reference to FIG. 7.

Figure 7:
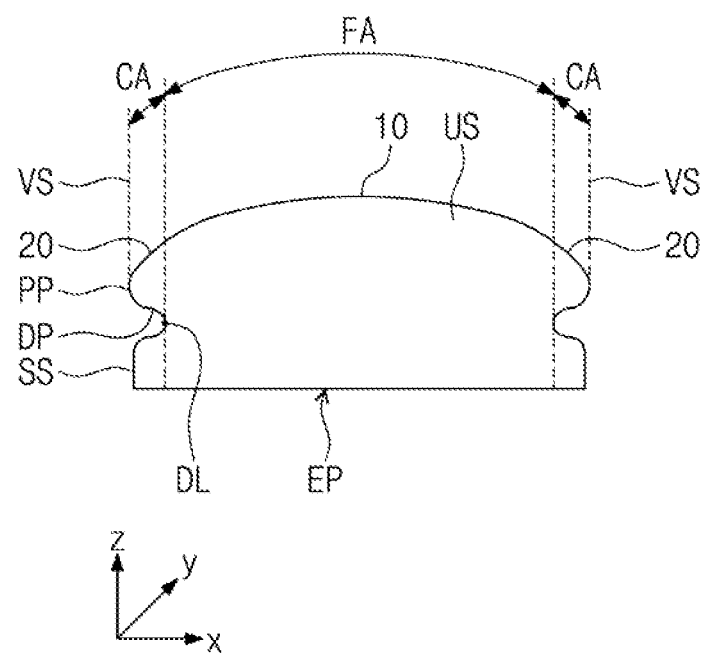
FIG. 7 is a cross-sectional view of a pressure pad according to an embodiment of the present disclosure.

FIG. 7 is a cross-sectional view that partially shows a lamination device according to an embodiment of the present disclosure.

Referring to FIG. 7, in an embodiment, the pressure pad EP includes a top surface US, a lateral surface SS, a depression DP, and a protrusion PP.

In an embodiment, the top surface US of the pressure pad EP has an upwardly convex shape. In particular, the top surface US of the pressure pad EP has an upwardly convex parabolic shape. For example, the top surface US of the pressure pad EP has an inclined surface whose height increases as approaching a center portion from an end portion.

In an embodiment, the lateral surface SS of the pressure pad EP extends, for example, in a z-axis direction depicted in FIG. 7.

For convenience of description, a reference plane VS is defined that extends from the lateral surface SS. The reference plane VS extends in a vertical direction, i.e., a z-axis direction.

In an embodiment, the pressure pad EP includes the depression DP that is inwardly recessed from the lateral surface SS. The depression DP is recessed to a predetermined depth from the reference plane VS. For example, an outer circumference of the depression DP is formed inside the reference plane VS. A depression line DL can be defined within the depression DP. The depression line DL is defined at an innermost portion in the depression DP. For example, when the depression DP extends in a longitudinal direction, i.e., a y-axis direction, the depression line DL also extends in a longitudinal, y-axis direction along the depression DP.

In an embodiment, the protrusion PP is formed on a top end of the depression DP. The protrusion PP protrudes a predetermined distance from the innermost portion in the depression DP to reference plane VS.

As described below, the depression DP and the protrusion PP affect a pressure applied to the panel PA or the window W. For example, the presence of the depression DP relatively decreases a pressure at a point adjacent to a boundary between the curved surface CS and the flat surface FS of the window W, and the presence of the protrusion PP relatively increases a pressure at an end of the curved surface CS of the window W. As described above, this improves uniformity of adhesion between the window W and the panel PA.

In an embodiment, the top surface US of the pressure pad EP includes a first surface 10 and a second surface 20. The first surface 10 overlaps the flat surface FS of the window W. The second surface 20 overlaps the curved surface CS of the window W.

Referring back to FIGS. 1 and 2, in an embodiment, a first region FA and a second region CA adjacent thereto are defined on the window W and the pressure sensor array 100. The pressure sensor array 100 includes a first part S1 that corresponds to the first region FA and a second part S2 that corresponds to the second region CA.

In an embodiment, the flat surface FS of the window W corresponds to the first region FA, and the curved surface CS of the window W corresponds to the second region CA.

In an embodiment, the first region FA of the pressure sensor array 100 overlaps the flat surface FS of the window W in the z-axis direction, and the second region CA of the pressure sensor array 100 the curved surface CS of the window W in the z-axis direction.

In an embodiment, the first surface 10 of the pressure pad EP corresponds to the first region FA, and the second surface 20 of the pressure pad EP corresponds to the second region CA.

In an embodiment, when the lamination device operates, in the first region FA, the flat surface FS of the window W is pressed against the first surface 10 of the pressure pad EP across the pressure sensor array 100, and in the second region CA, the curved surface CS of the window W is pressed against the second surface 20 of the pressure pad EP across the pressure sensor array 100.

In an embodiment, when the flat surface FS of the window W is pressed, a pressure applied to the first surface S1 of the pressure sensor array 100 differs from that applied to the second surface S2 of the pressure sensor array 100. The pressure sensor array 100 includes a plurality of electrodes that independently measure the different pressures. This will be further described below in detail with reference to FIGS. 6A to 6D.

Figure 3:
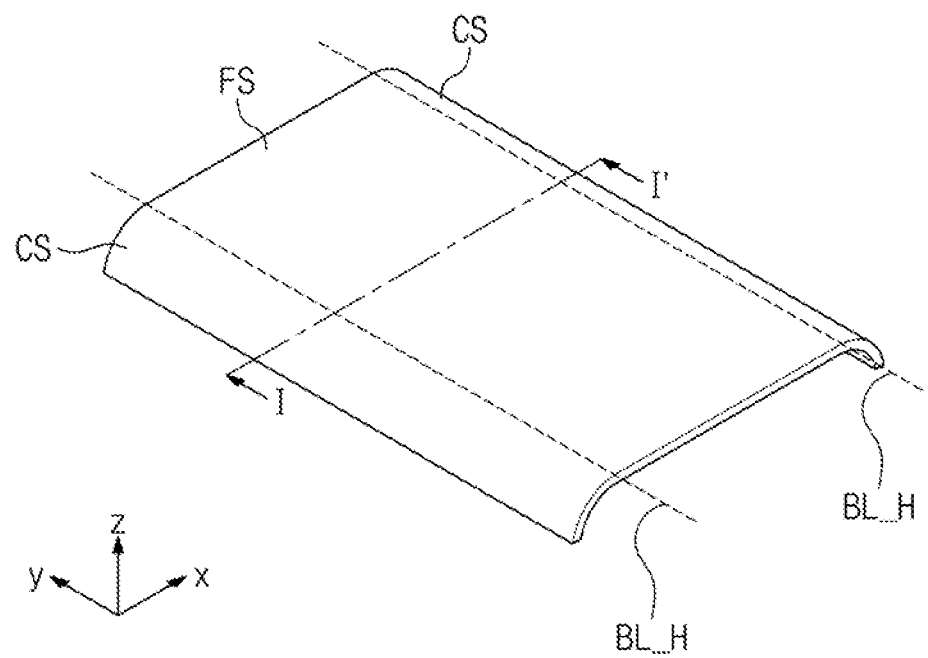
FIG. 3 is a perspective view that partially shows a lamination device according to an embodiment of the present disclosure.
Figure 4:
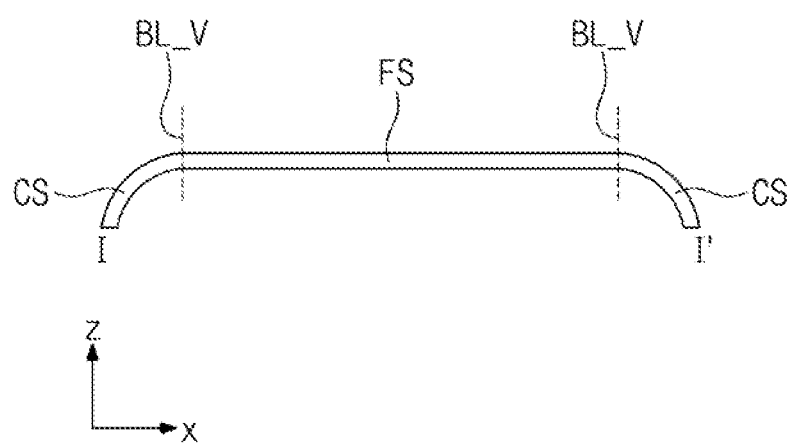
FIG. 4 is a cross-sectional view taken along line I-I' of FIG. 3.

The window W will be further described in detail with reference to FIGS. 3 and 4. FIG. 3 is a perspective view that partially shows a lamination device according to an embodiment of the present disclosure. FIG. 4 is a cross-sectional view taken along line I-I' of FIG. 3.

Referring to FIGS. 3 and 4, in an embodiment, the window W includes the flat surface FS and the curved surfaces CS disposed on opposite sides of the flat surface FS.

In an embodiment, a boundary can be defined between the flat surface FS and the curved surface CS. For example, the flat surface FS and the curved surface CS are located on opposite sides of the boundary.

For convenience of description, a horizontal boundary BL_H and a vertical boundary BL_V are defined as shown in FIGS. 3 and 4.

In an embodiment, the horizontal boundary BL_H is a border that separates the curved surface CS and the flat surface FS on the top surface of the window W. The horizontal boundary BL_H is located on an x-y plane and extends in a longitudinal direction, such as a y-axis direction (see FIG. 3). The vertical boundary BL_V is a border that distinguishes the curved surface CS and the flat surface FS of the window W. The vertical boundary BL_V extends in a vertical direction, i.e., the z-axis direction, and is located in a y-z plane (see FIG. 4).

In an embodiment, the panel PA will be further described with reference to FIGS. 5A and 5B. In an embodiment of the present disclosure, the panel PA is a display panel. The following will describe a display panel. FIG. 5B is a cross-section of a display panel depicted in FIG. 5A. FIG. 5B is a cross-section of a circuit element layer and a single pixel disposed on the circuit element layer illustrated in FIG. 5A.

Figure 5A:
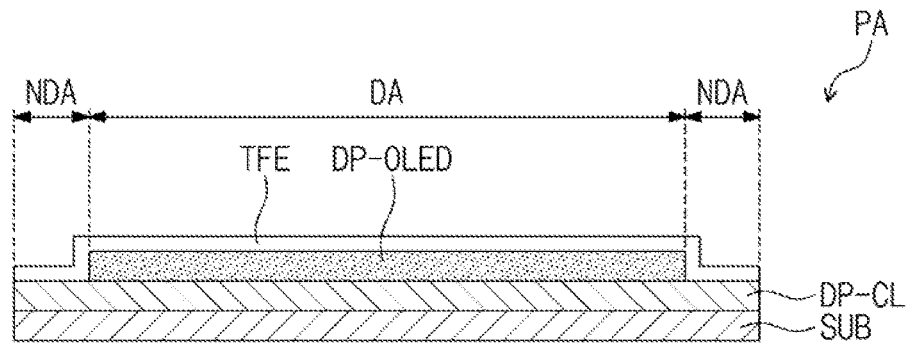
FIGS. 5A and 5B are cross-sectional views of a panel according to an embodiment of the present disclosure.
Figure 5B:
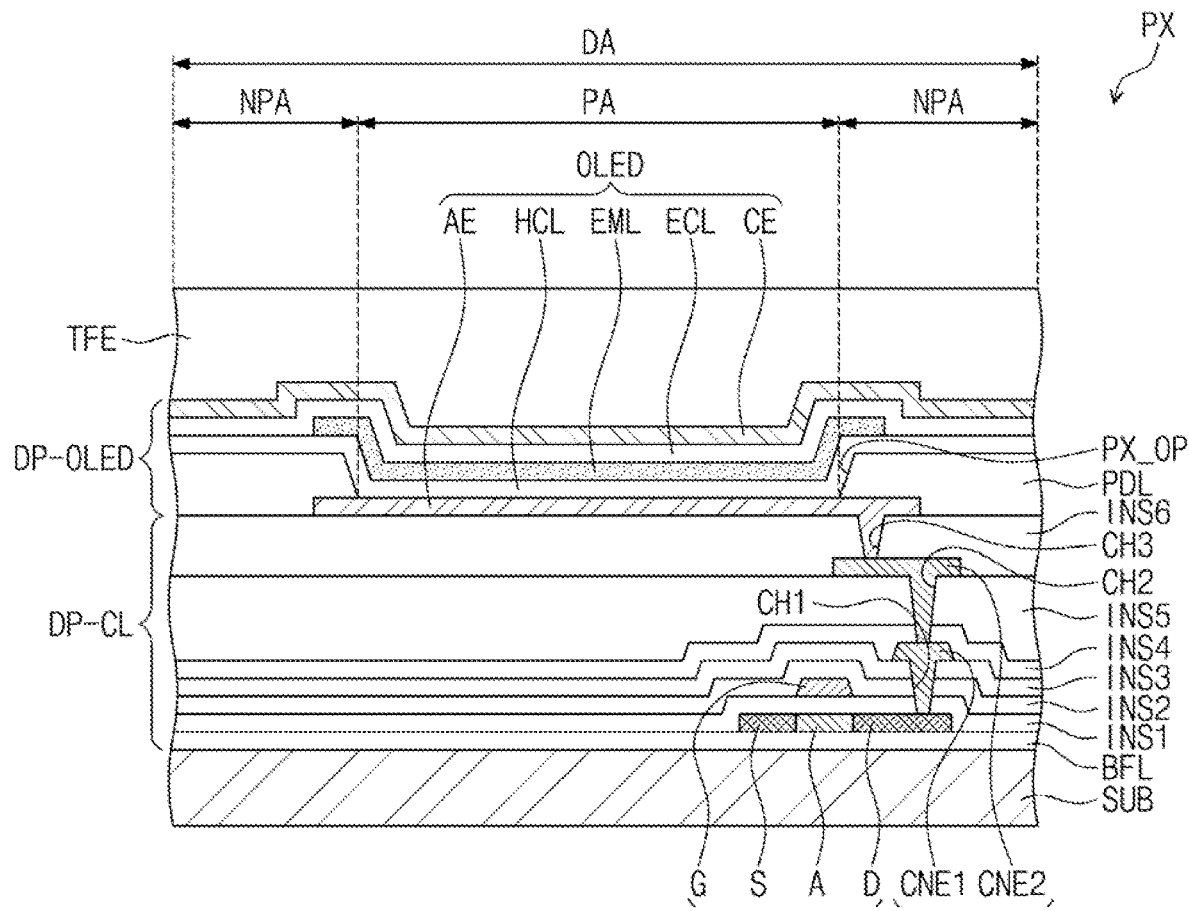

Referring to FIG. 5A, in an embodiment, the display panel PA includes a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED.

In an embodiment, the substrate SUB includes a display region DA and a non-display region NDA around the display region DA. The substrate SUB includes a flexible plastic material, such as polyimide (PI). The display element layer DP-OLED is disposed on the display region DA.

In an embodiment, a plurality of pixels are disposed on the circuit element layer DP-CL and the display element layer DP-OLED. Each of the pixels includes a transistor disposed on the circuit element layer DP-CL, and also a light emitting element disposed on the display element layer DP-OLED and that is connected to the transistor.

In an embodiment, the thin-film encapsulation layer TFE is disposed on the circuit element layer DP-CL and covers the display element layer DP-OLED. The thin-film encapsulation layer TFE includes inorganic layers and an organic layer between the inorganic layers. The inorganic layers protect the pixels against moisture and/or oxygen. The organic layer protects the pixels against foreign substances such as dust particles.

Referring to FIG. 5B, in an embodiment, a pixel PX includes a transistor TR and a light emitting element OLED. The light emitting element OLED includes a first electrode AE, a second electrode CE, a hole control layer HCL, an electron control layer ECL, and an emission layer EML. The first electrode AE is an anode electrode, and the second electrode CE is a cathode electrode.

In an embodiment, the transistor TR and the light emitting element OLED are disposed on the substrate SUB. A single transistor TR is illustrated by way of example, but the pixel PX may include at least one capacitor and a plurality of transistors that drive the light emitting element OLED. The display region DA includes an emission region PA in which the light emitting element OLED is disposed, and a non-emission region NPA around the emission region PA.

In an embodiment, a buffer layer BFL is disposed on the substrate SUB, and the buffer layer BFL is an inorganic layer. A semiconductor pattern is disposed on the buffer layer BFL. The semiconductor pattern includes polysilicon. However, embodiments of the present disclosure are not limited thereto, and in other embodiments, the semiconductor pattern includes amorphous silicon or metal oxide.

The semiconductor pattern may be doped with n-type or p-type impurities. In an embodiment, the semiconductor pattern includes a heavily doped section and a lightly doped section. The heavily doped section is more conductive than the lightly doped section, and substantially serves as a source/drain of the transistor TR. The lightly doped section substantially corresponds to an active region or channel of the transistor TR.

In an embodiment, the transistor TR includes a source S, an active region A, and a drain D that are formed from the semiconductor pattern. A first dielectric layer INS1 is disposed on the semiconductor pattern and the buffer layer BFL. A gate G of the transistor TR is disposed on the first dielectric layer INS1.

In an embodiment, a second dielectric layer INS2 is disposed on the gate G and the first dielectric layer INS1. A third dielectric layer INS3 is disposed on the second dielectric layer INS2. The transistor TR and the light emitting element OLED are provided with a connection electrode CNE that connects the transistor TR to the light emitting element OLED. The connection electrode CNE includes a first connection electrode CNE1 and a second connection electrode CNE2 disposed on the first connection electrode CNE1.

In an embodiment, the first connection electrode CNE1 is disposed on the third dielectric layer INS3, and is connected to the drain D through a first contact hole CH1 that penetrates the first to third dielectric layers INS1 to INS3. A fourth dielectric layer INS4 is disposed on the first connection electrode CNE1 and the third dielectric layer INS3. A fifth dielectric layer INS5 is disposed on the fourth dielectric layer INS4. The second connection electrode CNE2 is disposed on the fifth dielectric layer INS5. The second connection electrode CNE2 is connected to the first connection electrode CNE1 through a second contact hole CH2 that penetrates the fourth and fifth dielectric layers INS4 and INS5.

In an embodiment, a sixth dielectric layer INS6 is disposed on the second connection electrode CNE2 and the fifth dielectric layer INS5. The circuit element layer DP-CL includes layers from the buffer layer BFL to the sixth dielectric layer INS6. The first to sixth dielectric layers INS1 to INS6 may be inorganic or organic layers.

In an embodiment, the first electrode AE is disposed on the sixth dielectric layer INS6. The first electrode AE is connected to the second connection electrode CNE2 through a third contact hole CH3 that penetrates the sixth dielectric layer INS6. A pixel definition layer PDL is disposed on the first electrode AE and the sixth dielectric layer INS6, and the pixel definition layer PDL exposes a portion of the first electrode AE. The pixel definition layer PDL includes an opening PX_OP that exposes the portion of the first electrode AE.

In an embodiment, the hole control layer HCL is disposed on the first electrode AE and the pixel definition layer PDL. The hole control layer HCL is disposed in common in the emission region PA and the non-emission region NPA. The hole control layer HCL includes a hole transport layer and a hole injection layer.

In an embodiment, the emission layer EML is disposed on the hole control layer HCL. The emission layer EML is disposed at a location that corresponds to the opening PX_OP. The emission layer EML may include one or more of an organic material and an inorganic material. The emission layer EML generates one of red light, green light, or blue light.

In an embodiment, the electron control layer ECL is disposed on the emission layer EML and the hole control layer HCL. The electron control layer ECL is disposed in common in the emission region PA and the non-emission region NPA. The electron control layer ECL includes an electron transport layer and an electron injection layer.

In an embodiment, the second electrode CE is disposed on the electron control layer ECL. The second electrode CE is disposed in common on the plurality of pixels PX. The thin-film encapsulation layer TFE is disposed on the light emitting element OLED. A layer where the light emitting element OLED is disposed is the display element layer DP-OLED.

In an embodiment, the first electrode AE is supplied through the transistor TR with a first voltage, and the second electrode CE is supplied with a second voltage that is less than the first voltage. Holes and electrons injected into the emission layer EML from the hole control layer HCL and the electron control layer ECL, respectively, combine with each other to produce excitons, and the light emitting element OLED emit light as the excitons return to a ground state.

Figure 6A:
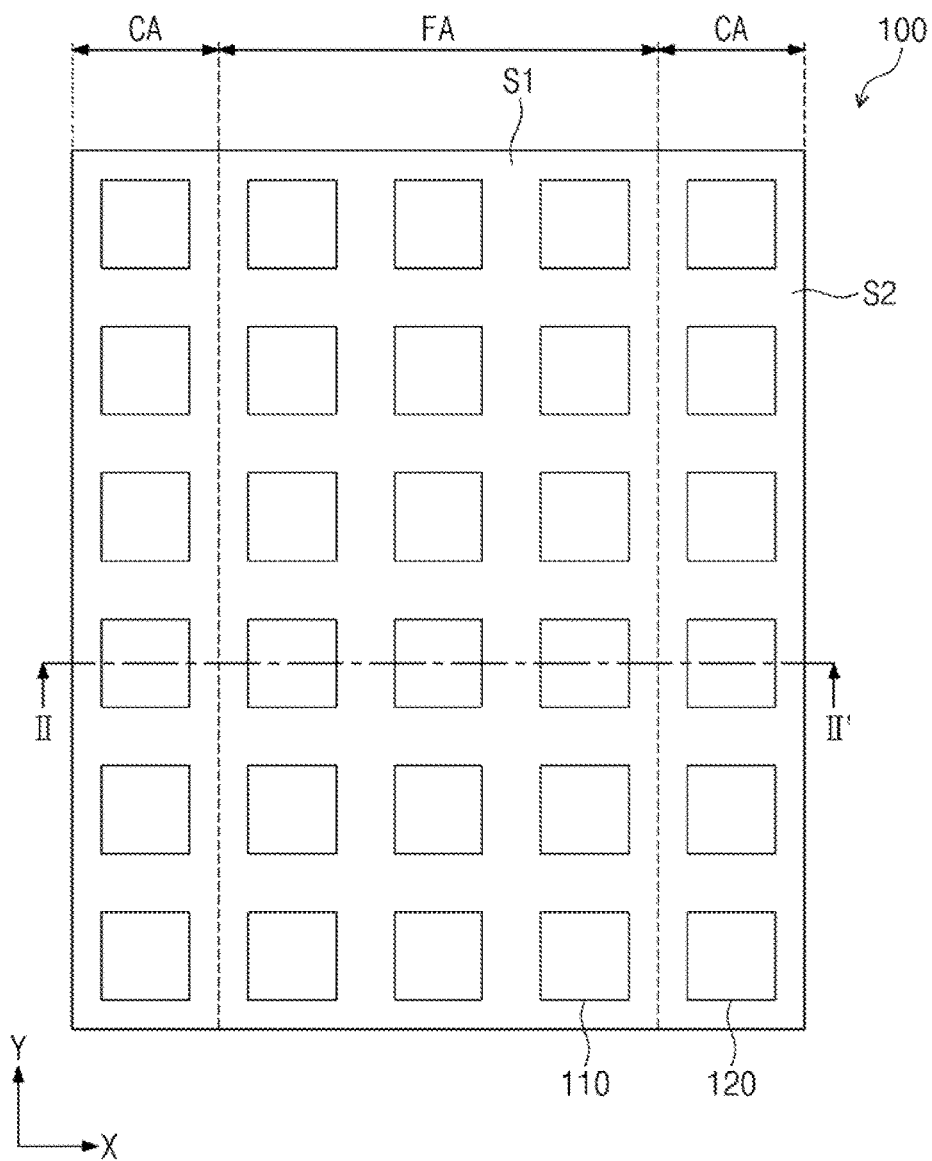
FIGS. 6A and 6B are respectively plan and cross-sectional views of a pressure sensor array according to an embodiment of the present disclosure.
Figure 6B:
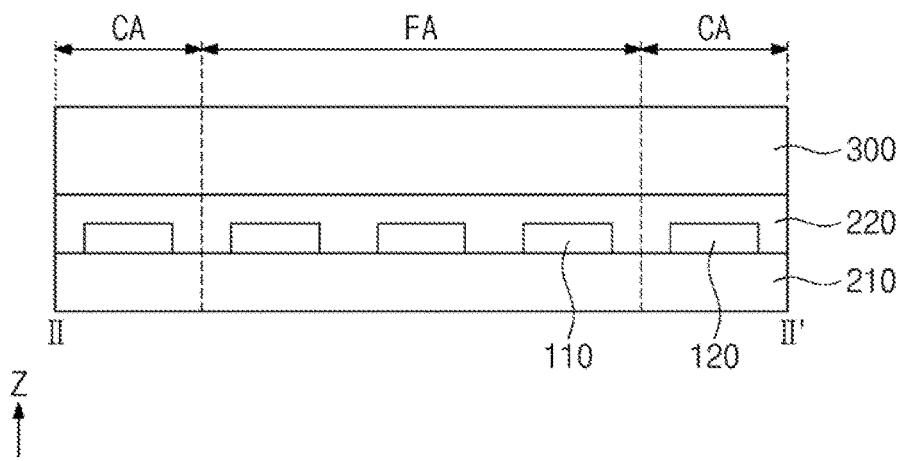
Figure 6C:
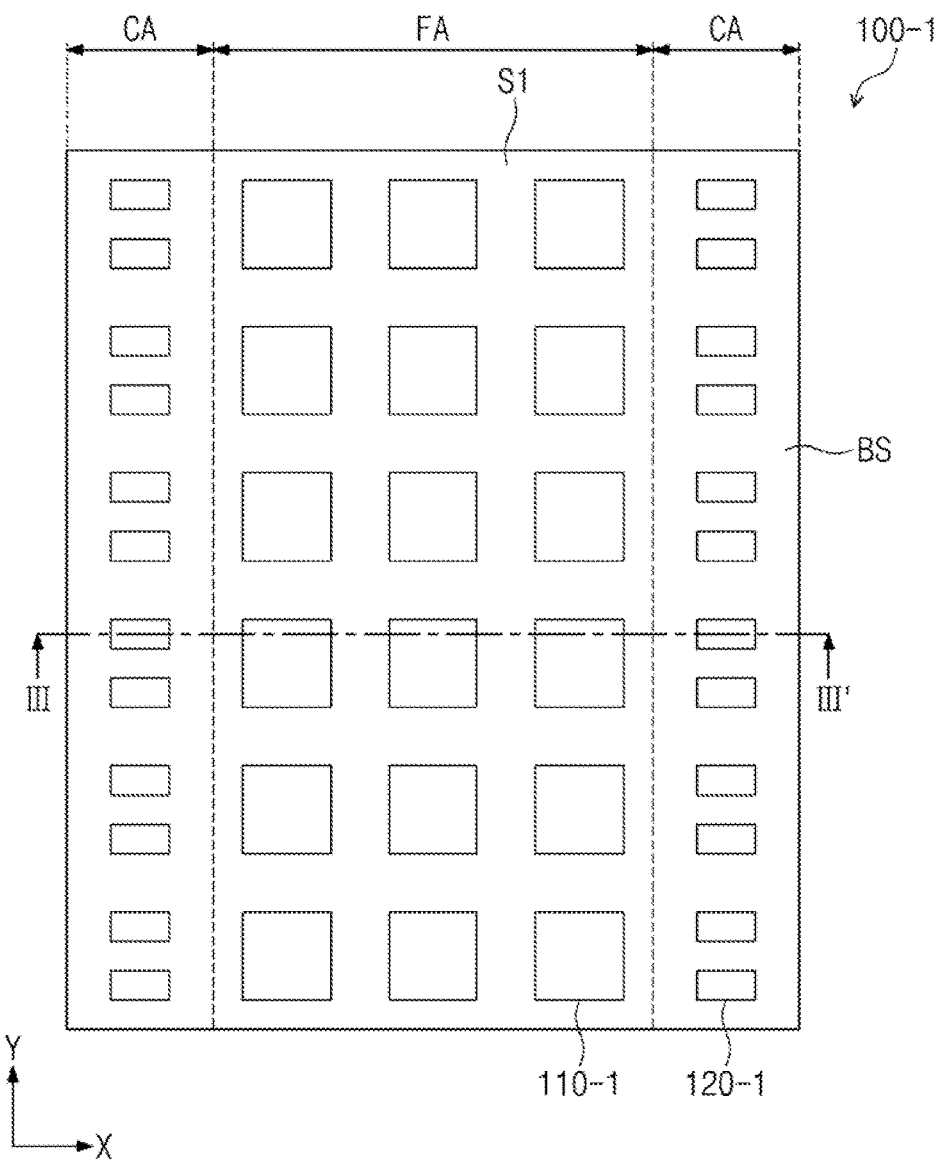
FIGS. 6C and 6D are respectively plan and cross-sectional views of a pressure sensor array according to another embodiment of the present disclosure.
Figure 6D:
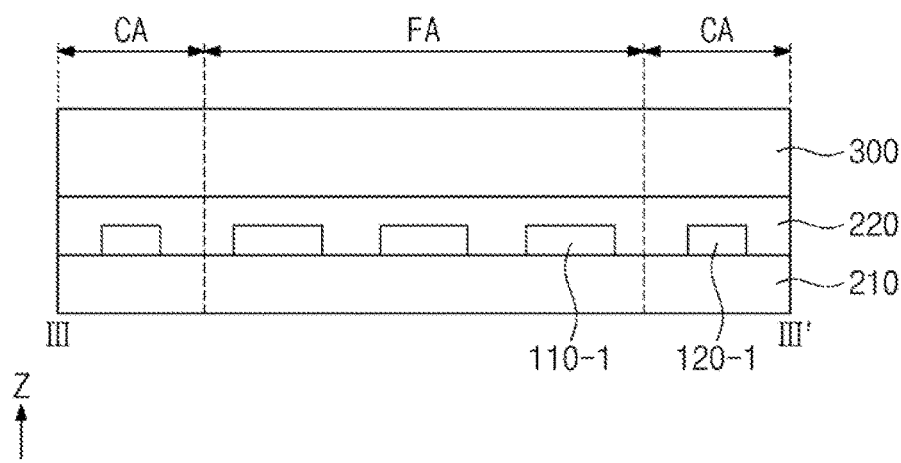

FIGS. 6A to 6D show a pressure sensor array, according to an embodiment. FIGS. 6A and 6B are respectively plan and cross-sectional views of a pressure sensor array according to an embodiment of the present disclosure. FIGS. 6C and 6D are respectively plan and cross-sectional views of a pressure sensor array according to another embodiment of the present disclosure.

Referring to FIGS. 6A and 6B, in an embodiment, the pressure sensor array 100 includes a first electrode 110 and a second electrode 120.

In an embodiment, the first electrode 110 is disposed on the first surface 10 of the pressure pad EP. The first part S1 of the pressure sensor array 100 includes the first electrode 110. The first surface 10 and the first part S1 overlap the first region FA. For example, the first electrode 110 is disposed in the first region FA. The first region FA overlaps the flat surface FS of the window W. For example, the first electrode 110 measures a pressure applied from the flat surface FS of the window W.

In an embodiment, the second electrode 120 is disposed on the second surface 20 of the pressure pad EP. The second part S2 of the pressure sensor array 100 includes the second electrode 120. The second surface 20 and the second part S2 overlap the second region CA. For example, the second electrode 120 is disposed in the second region CA. The second region CA overlaps the curved surface CS of the window W. For example, the second electrode 120 measures a pressure applied from the curved surface CS of the window W.

In an embodiment, a plurality of first electrodes 110 and a plurality of second electrodes 120 are provided. The plurality of first electrodes 110 and the plurality of second electrodes 120 are insulated from each other.

In an embodiment, in the first region FA, each of the plurality of first electrodes 110 independently measures pressure applied to locations on which each of the plurality of first electrodes 110 is disposed. In the second region CA, each of the plurality of second electrodes 120 independently measures pressure applied to locations on which each of the plurality of second electrodes 120 is disposed. The first part S1 that includes the first electrodes 110 overlaps the flat surface FS of the window W, and the second part S2 that includes the second electrodes 120 overlaps the curved surface CS of the window W. A difference in shape between the flat and curved surfaces results in a difference between pressure applied to the first part S1 and pressure applied to the second part S2. The pressure sensor array 100 according to an embodiment includes the first electrodes 110 and the second electrodes 120 to distinguish and measure different pressures applied to locations in the first part S1 and locations in the second part S2.

In an embodiment, a modulus of elasticity of the second electrodes 120 is less than that of the first electrodes 110. The second part S2 of the pressure sensor array 100 overlaps the curved surface CS of the window W and has a predetermined curvature. Therefore, the modulus of elasticity of the second electrodes 120 disposed on the second part S2 is less than that of the first electrodes 110 to prevent delamination of the second electrodes 120.

FIG. 6B illustrates a cross-sectional view taken along line II-II' of FIG. 6A. Referring to FIG. 6B, in an embodiment, the pressure sensor array 100 includes a first stretchable substrate 210, a second stretchable substrate 220, and a support substrate 300.

In an embodiment, the first stretchable substrate 210 is a base for the first electrode 110 and the second electrodes 120. For example, the first electrodes 110 and the second electrodes 120 are disposed on the first stretchable substrate 210. The first stretchable substrate 210 is disposed on the pressure pad EP shown in FIG. 2, and is adhered through the adhesive member AD-1 shown in FIG. 2 to the pressure pad EP. In other words, the adhesive member AD-1 is interposed between the first stretchable substrate 210 and the pressure pad EP.

In an embodiment, the second stretchable substrate 220 is disposed on the first stretchable substrate 210. The second stretchable substrate 220 covers the first and second electrodes 110 and 120. In other words, the first and second electrodes 110 and 120 are disposed between the first stretchable substrate 210 and the second stretchable substrate 220.

In an embodiment, the first and second stretchable substrates 210 and 220 include a stretchable polymer thin film. The first and second stretchable substrates 210 and 220 include a low modulus material to prevent delamination of a portion that overlaps the curved surface CS of the window W.

In an embodiment, the support substrate 300 is disposed on the first and second electrodes 110 and 120. The support substrate 300 covers the first and second electrodes 110 and 120. The support substrate 300 includes a rigid substrate or a coating to endure pressure. The support substrate 300 includes the same material as that of the pressure pad EP. For example, the support substrate 300 includes silicon.

In an embodiment, the second stretchable substrate 220 that covers the first and second electrodes 110 and 120 is omitted. For example, the first and second electrodes 110 and 120 are disposed on the first stretchable substrate 210 and the support substrate 300 directly covers the first and second electrodes 110 and 120. A thickness of the support substrate 300 is greater than a thickness of the first stretchable substrate 210.

In an embodiment, the first and second electrodes 110 and 120 each include various pressure detection sensors. For example, a plurality of first electrodes 110 and a plurality of second electrodes 120 may be a piezo-resistive type, a piezo-capacitive type, or a transistor type. A piezo-resistive type measures a variation in piezo-resistance of a conductive material caused by physical deformation. A piezo-capacitive type measures piezo-capacitance caused by a thickness variation that results from physical deformation or is caused by a variation in contact area between an electrode and a dielectric. A transistor type acquires electrical signals due to accumulation and movement of charges of a semiconductor, and uses gate electrode amplification to achieve real-time conversion of fine external physical stimulus.

In an embodiment, a plurality of first electrodes 110 and a plurality of second electrodes 120 are all the same type. For example, a plurality of first electrodes 110 and a plurality of second electrodes 120 are all piezo-resistive types.

Referring to FIGS. 6C and 6D, in an embodiment, a first electrode 110-1 and a second electrode 120-1 have different sizes from each other. The second electrode 120-1 is smaller than the first electrode 110-1. For example, the number of the second electrodes 120-1 that correspond to a single first electrode 110-1 may be two or more. The location of the second electrode 120-1 corresponds to the curved surface CS of the window W, and a plurality of second electrodes 120-1 are provided to distinguish and measure different pressures applied to various locations on the second region CA. In comparison with an embodiment of FIGS. 6A and 6B, because the second electrode 120-1 is smaller than the first electrode 110-1, precise measurement can be achieved and delamination can be prevented on curved surfaces. In FIGS. 6C and 6D, two second electrodes 120-1 adjacent in the y-axis direction correspond to a single first electrode 110-1, but embodiments of the present disclosure are not limited thereto, and in other embodiments, two second electrodes 120-1 adjacent in an x-axis direction correspond to a single first electrode 110-1.

Figure 6E:
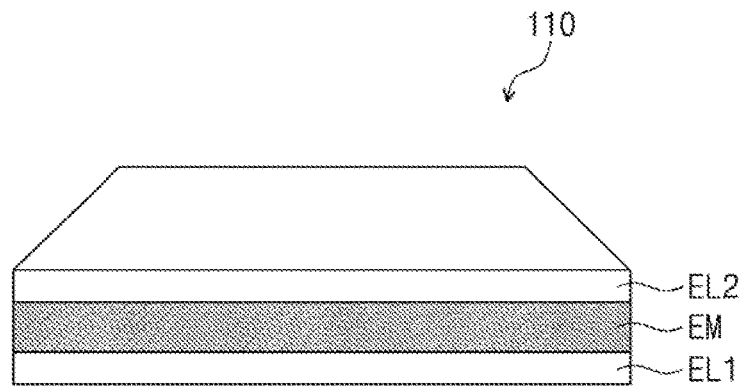
FIGS. 6E to 6G are perspective views of first and second electrodes according to an embodiment of the present disclosure.
Figure 6F:
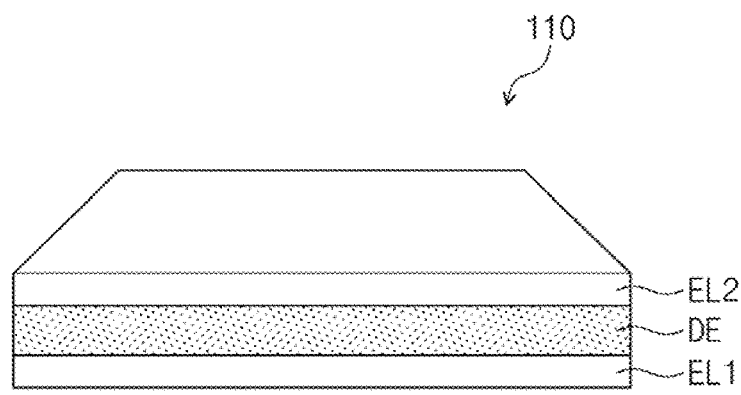
Figure 6G:
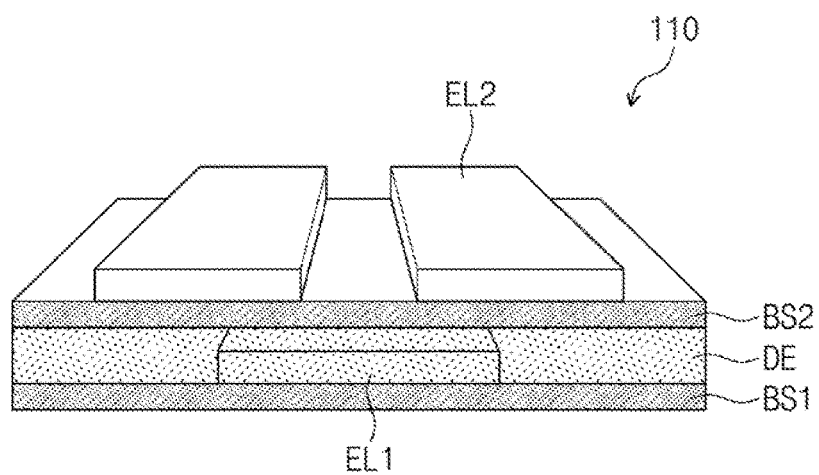

FIGS. 6E to 6G are perspective views that show first and second electrodes according to embodiments of the present disclosure. In the present disclosure, a sensor includes electrodes that include the first and second electrodes 110 and 120 disposed on the pressure sensor array 100. In FIGS. 6E to 6G, the first electrode 110 is illustrated by way of example. Embodiments of the present disclosure, however, are not limited thereto, and the sensors or electrodes that include the first and second electrodes 110 and 120 disposed in the pressure sensor array 100 of a present embodiment may have various different types of electrodes. In this description, the first electrode 110 is called a sensor.

FIG. 6E shows a piezo-resistive sensor according to an embodiment. The piezo-resistive type sensor 110 includes a bottom electrode EL1, a top electrode EL2, and a conductive material EM disposed between the bottom electrode EL1 and the top electrode EL2. The sensor 110 measures a variation in resistance of the conductive material EM caused by a physical deformation, and senses a pressure based on the variation in resistance.

FIG. 6F shows a piezo-capacitive type sensor according to an embodiment. The piezo-capacitive type sensor 110 includes a bottom electrode EL1, a top electrode EL2, and a dielectric DE disposed between the bottom electrode EL1 and the top electrode EL2.

A piezo-capacitive type sense a pressure based on piezo-capacitance caused by a variation in thickness of the dielectric DE that results from a physical deformation or is caused by a variation in contact area between the bottom and top electrodes EL1 and EL2 and the dielectric DE.

FIG. 6G shows a transistor type sensor according to an embodiment. The transistor type sensor 110 includes a first substrate BS1, a second substrate BS2, a bottom electrode EL1, a top electrode EL2, and a dielectric DE. The dielectric DE is disposed between the first substrate BS1 and the second substrate BS2. The bottom electrode EL1 is disposed on the first substrate BS1 and is covered by the dielectric DE. The top electrode EL2 is disposed on the second substrate BS2. The second substrate BS2 includes a semiconductor. The bottom electrode EL1 corresponds to a gate electrode.

A transistor type acquires electrical signals due to accumulation and movement of charges of semiconductors, and gate electrode amplification achieves real-time conversion of fine external physical stimulus.

FIGS. 6E to 6G show sensor types according to embodiments of the present disclosure. However, sensors of embodiments of the present disclosure are not limited thereto, and other typical pressure sensor types can be provided in other embodiments.

An operation of a lamination device according to an embodiment of the present disclosure is described with reference to FIGS. 8A to 8H. FIGS. 8A to 8H are cross-sectional views of a lamination device according to an embodiment of the present disclosure.

Figure 8A:
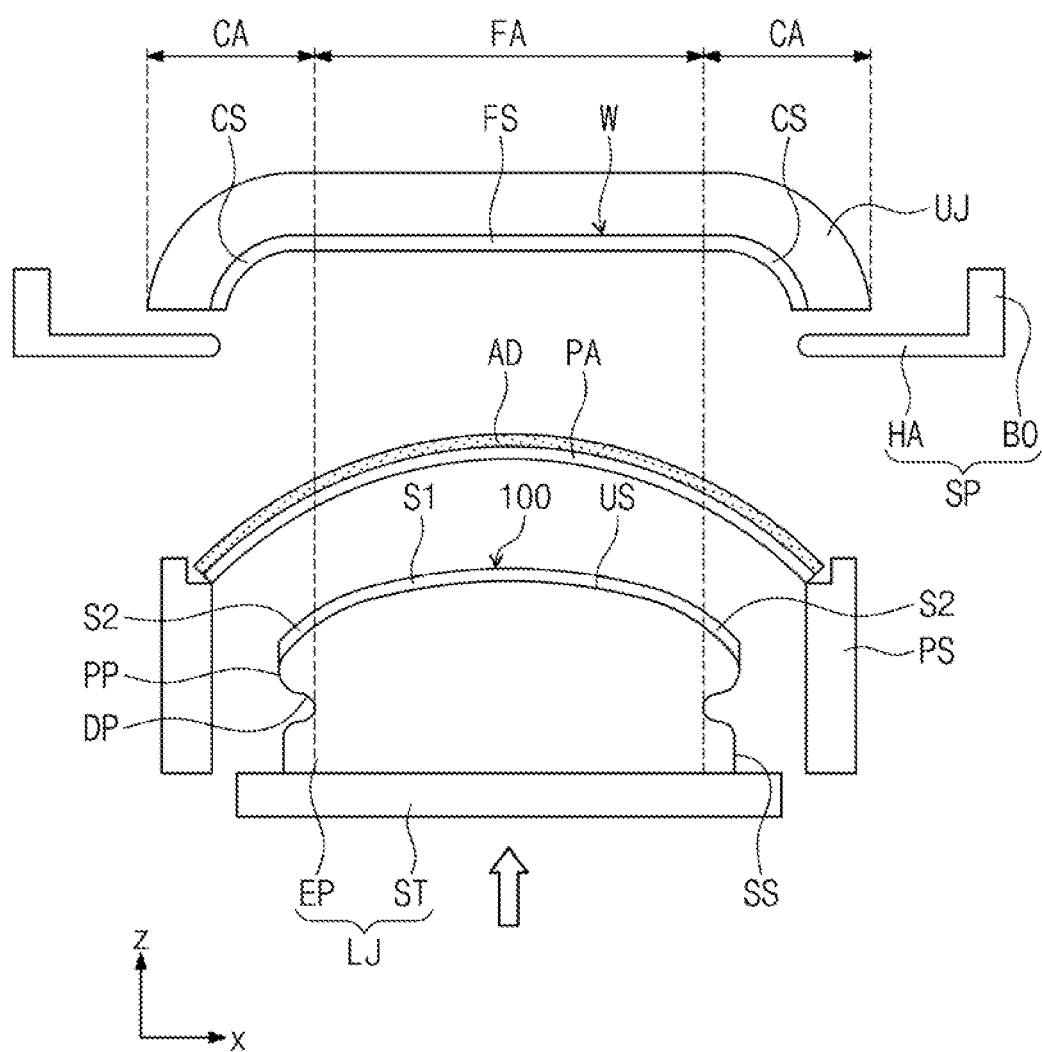
FIGS. 8A to 8H are cross-sectional views of a lamination process according to an embodiment of the present disclosure.

An initial state will be first described with reference to FIG. 8A. In an embodiment, the expression "initial state" means a state in which the panel PA is disposed on the panel supporter PS, and the window W, the adhesive layer AD, the panel PA, and the pressure pad EP are spaced apart from each other. The following describes a state in which the pressure sensor array 100 is adhered through the adhesive member AD-1, shown in FIG. 2, onto the pressure pad EP. For example, FIGS. 8A to 8H show a state in which the pressure sensor array 100 is integrally adhered to the pressure pad EP. The adhesive member AD-1 is omitted. In addition, for clarity of illustration, neither the first electrode 110 nor the second electrode 120 of the pressure sensor array 100 is illustrated, although the first electrode 110 and the second electrode 120 are respectively disposed on the first part S1 and the second part S2.

In an initial state according to an embodiment, the panel supporters PS support opposite ends of the panel PA, and the panel supporters PS approach each other.

In an embodiment, as the panel supporters PS approach each other, the panel PA bends into an arch shape. In particular, the panel PA bends into an upwardly convex parabolic shape when viewed in a cross-section.

In an embodiment, an attachment procedure continues as the first jig UJ and the second jig LJ approach each other. For example, the first and second jigs UJ and LJ approach each other as the first jig UJ descends in a z-axis direction, the second jig LJ ascends in a z-axis direction, or the first jig UJ and the second jig LJ ascend and descend respectively in the z-axis directions.

For convenience of description, an example will be described in which the first jig UJ stands still, and the second jig LJ rises upwards.

Figure 8B:
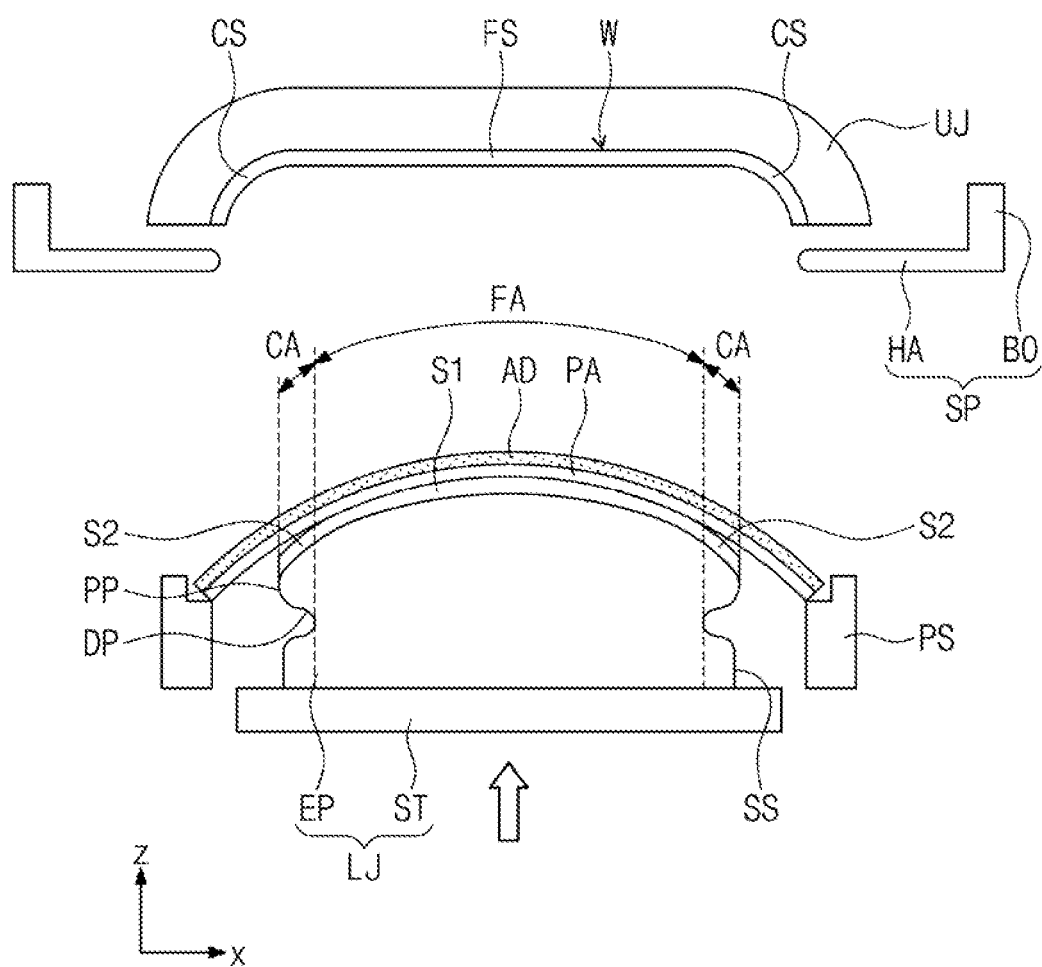

Referring to FIG. 8B, in an embodiment, as the second jig LJ rises upwards, a bottom surface of the panel PA and a top surface of the pressure pad EP contact each other. As described above, the pressure pad EP is elastic, and a shape of the pressure pad EP changes when pressure is applied due to contact between the pressure pad EP and the panel PA. For example, the rising of the second jig LJ allows the bottom surface of the panel PA to be in contact with the top surface of the pressure pad EP. In more detail, the bottom surface of the panel PA contacts a top surface of the pressure sensor array 100 that is integrally adhered to the pressure pad EP. As shown in FIG. 8B, the first part S1 of the pressure sensor array 100 contacts the panel PA first, after which the second part S2 of the pressure sensor array 100 contacts the panel PA. A pressure is first applied to the first part S1. For example, the applied pressure is measured only by the first electrode 110 disposed on the first part S1.

Figure 8C:
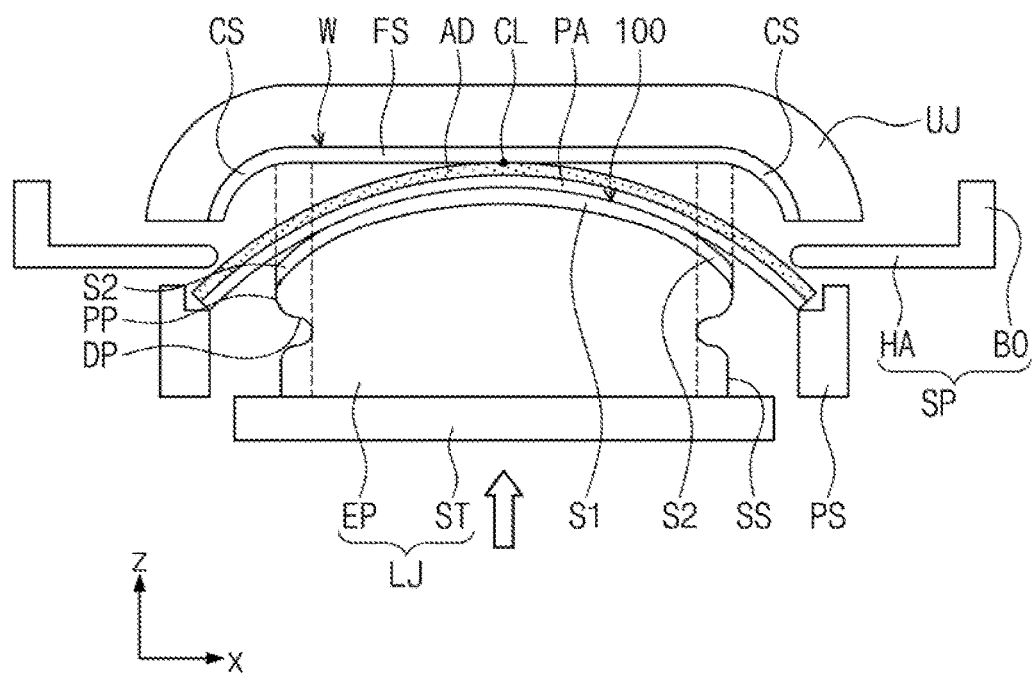

Referring to FIG. 8C, in an embodiment, the second jig LJ rises upwards, and thus the adhesive layer AD disposed on the panel PA first contacts a central portion of the window W. In this case, the flat surface FS of the window W is in line contact with the adhesive layer AD on the parabolic shaped panel PA at the central portion. For example, an adhesion line CL forms at the window W and the adhesive layer AD. The window W continuously applies pressure to the first part S1, and the first electrode 110 measures the pressure applied to the first part S1.

Figure 8D:
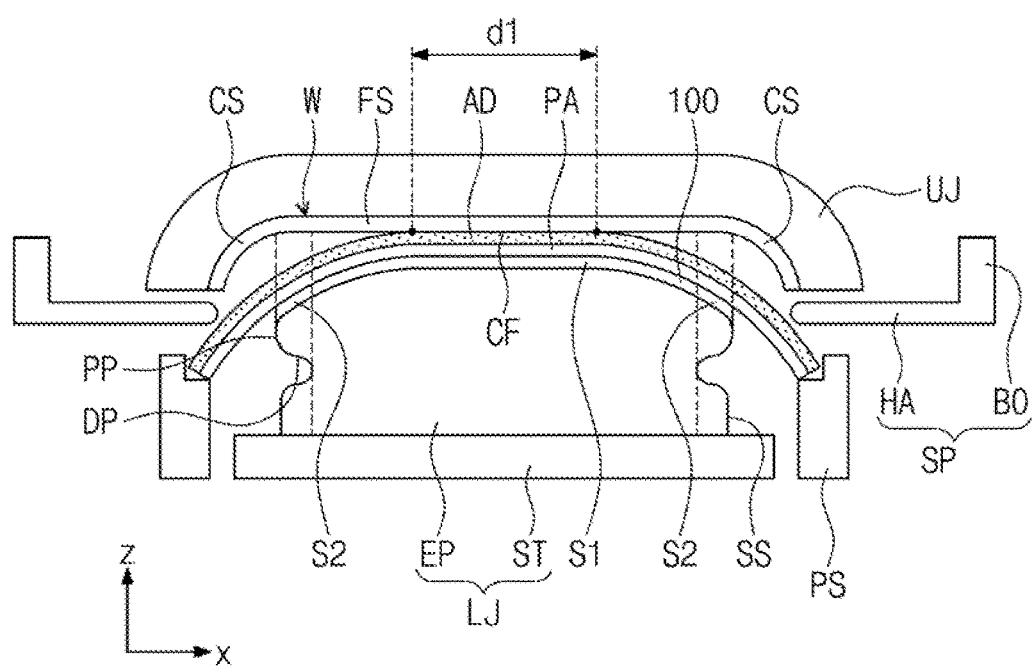

Referring to FIG. 8D, in an embodiment, as the second jig LJ continuously rises upwards, a contact area between the window W and the adhesive layer AD increases from the adhesion line CL toward opposite sides of the adhesion line CL. For example, the window W and the adhesive layer AD become in line contact with each other.

Therefore, in an embodiment, a contact surface CF forms where the window W and the adhesive layer AD are in contact with each other. For example, the window W and the panel PA progressively adhere to each other toward opposite sides from their central section. In this case, a width of the contact surface CF is a first distance d1. The first distance d1 is less than a width between the vertical boundaries BL_V. The window W progressively applies pressure to the first part S1 of the pressure sensor array 100.

Figure 8E:
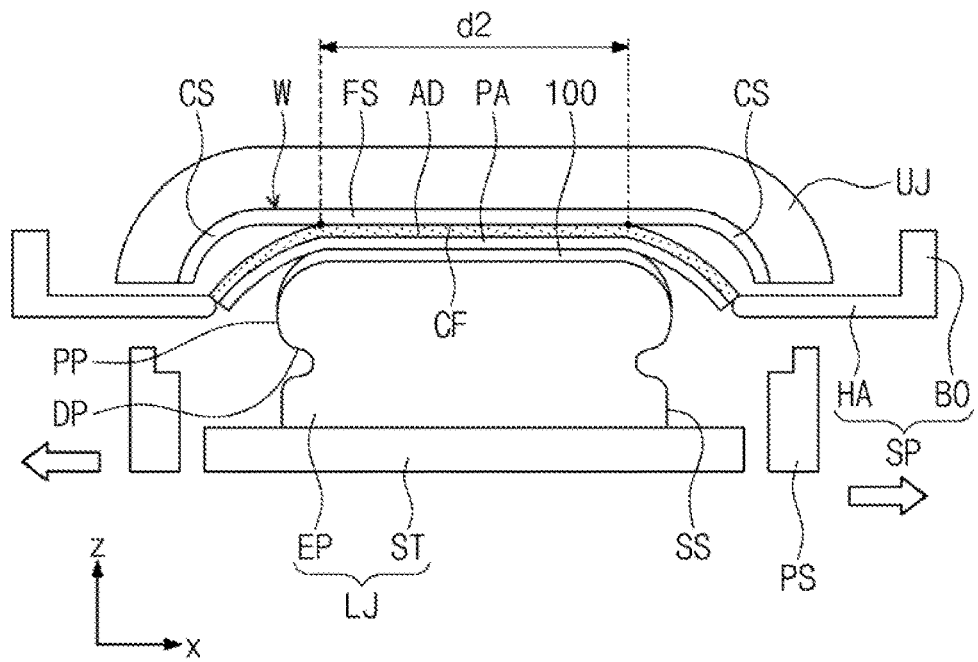

Referring to FIG. 8E, in an embodiment, the panel supporters PS depart from the panel PA to be spaced apart from the panel PA. Therefore, the force applied to the panel PA is removed to allow opposite ends of the panel PA to rise a predetermined distance. The opposite ends of the panel PA rise upwards and contact the stopper SP. For example, the panel PA or the adhesive layer AD contacts an end of the handle HA of the stopper SP.

In this case, in an embodiment, the width of the contact surface CF is a second distance d2 that is greater than the first distance d1. In particular, an area of the window W increases where the pressure is applied to the first part S1 of the pressure sensor array 100. A plurality of first electrodes 110 measures different pressures based on position.

In an embodiment, when the panel PA and the window W adhere to each other, that adhesion gradually proceeds from a central section toward opposite sides to avoid air interference between the panel PA and the window W. The stopper SP is disposed between a distal end of the panel PA and a distal end of the window W, and thus the distal end of the panel PA and the distal end of the window W first contact each other to prevent an air layer from being formed between the panel PA and the window W.

In an embodiment, the stoppers SP inwardly push the opposite ends of the panel PA to prevent premature contact between the end of the panel PA and the end of the window W. For example, the stoppers SP guide the panel PA and the window W to gradually adhere to each other from a central section toward opposite sides.

Figure 8F:
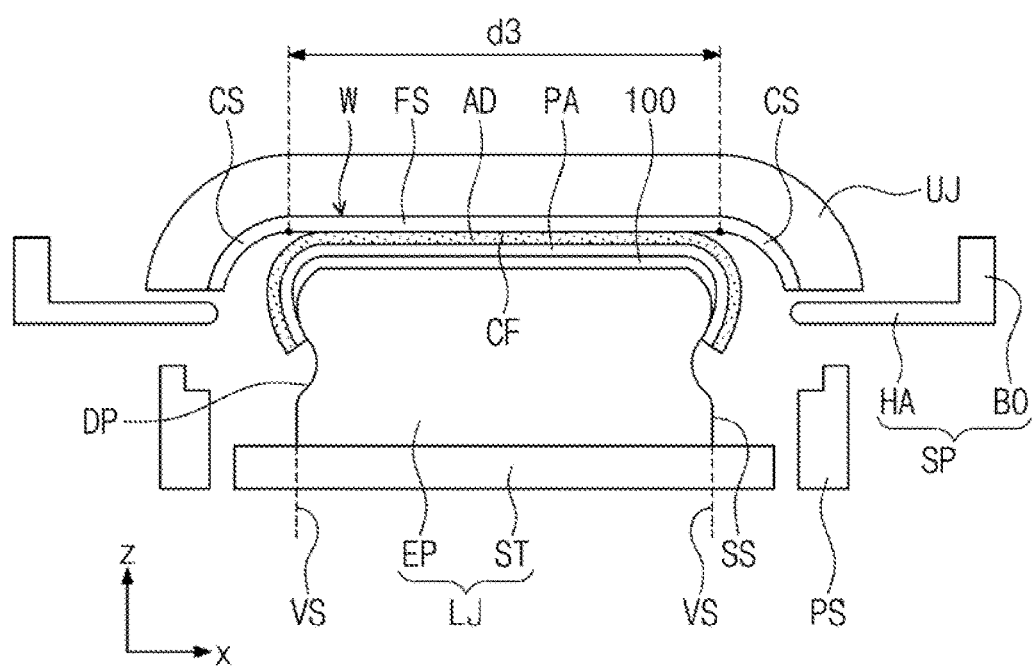

FIG. 8F is a cross-sectional view of a lamination device according to another embodiment of the present disclosure.

Referring to FIG. 8F, in an embodiment, the stopper SP pushes the end of the panel PA into the depression DP. Therefore, the end of the panel PA is positioned within the reference plane VS. When the stopper SP pushes the end of the panel PA into the depression DP, premature contact between the end of the panel PA and the end of the window W can be prevented.

Figure 8G:
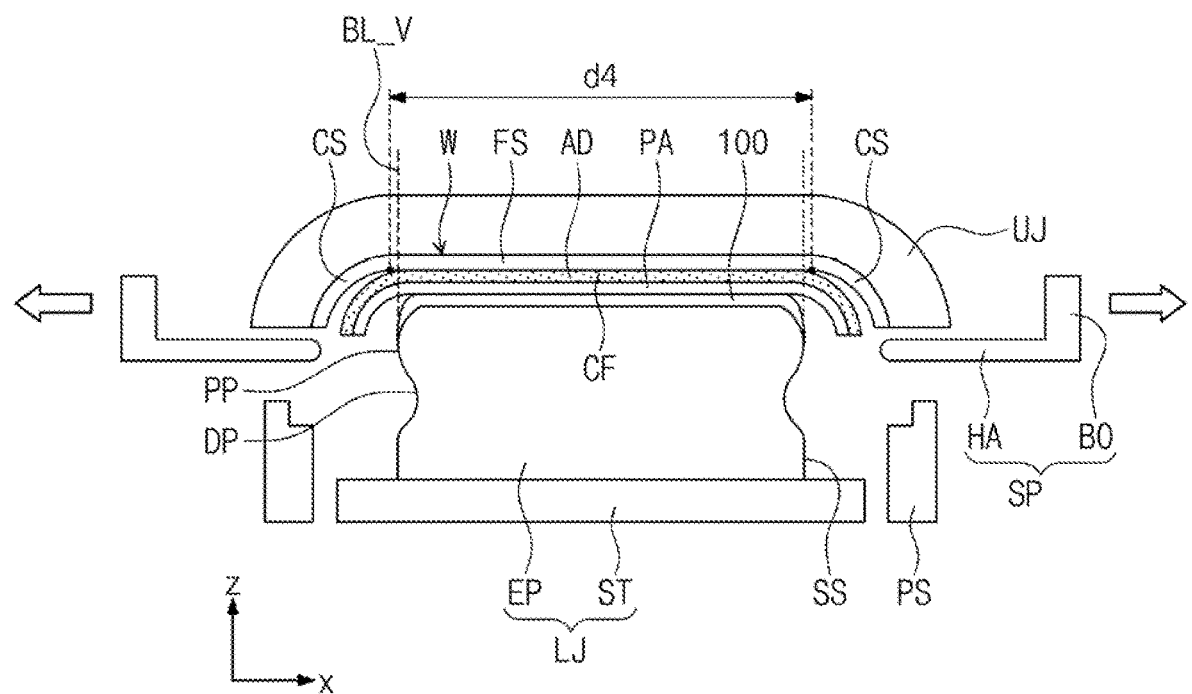

Referring to FIG. 8G, in an embodiment, the width of the contact surface CF continuously increases from a third distance d3 shown in FIG. 8F to a fourth distance d4. In an embodiment, the fourth distance d4 is greater than the width between the vertical boundaries BL_V. In this case, the curved surface CS of the window W contacts the adhesive layer AD.

In an embodiment, the depression DP and the protrusion PP adjust pressure applied to the panel PA and the curved surface CS of the window W. In an embodiment, the depression DP extends inwards to a location that corresponds to the vertical boundary BL_V of the window W.

Moreover, in an embodiment, the location of the protrusion PP corresponds to the curved surface CS that is adjacent to the end of the window W. When the location of the protrusion PP corresponds to the curved surface CS of the window W, the curved surface CS of the window W experiences a pressure that is greater than that experienced when the protrusion PP is absent. Therefore, an increase in pressure at the end of the window W can prevent the occurrence of adhesion failure.

In an embodiment, the stoppers SP are spaced apart from each other after the curved surface CS and the adhesive layer AD contact each other or after the width of the contact surface CF exceeds the width between the vertical boundaries BL_V. The stoppers SP may move simultaneously or sequentially with the lamination procedure. For example, in an embodiment, the stoppers SP move simultaneously with the rising of the second jig LJ. In another embodiment, after a specific time, the second jig LJ stops and the stoppers SP move backwards. The specific time may be, as described above, a time after the width, e.g., third distance d3, of the contact surface CF continuously increases to value greater than the width between the vertical boundaries BL_V.

Figure 8H:
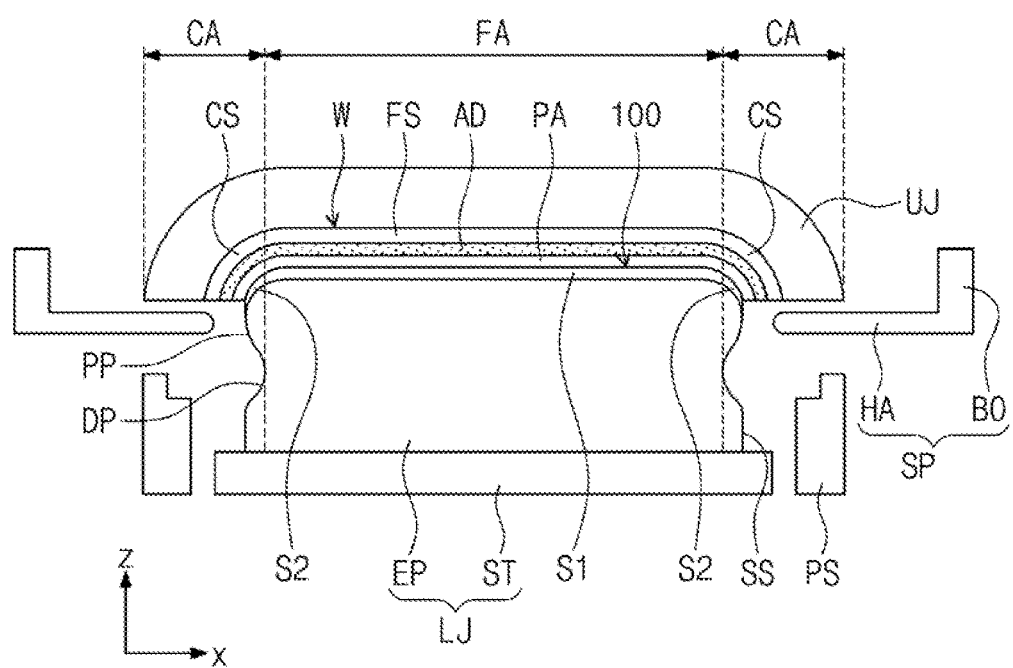

Referring to FIG. 8H, in an embodiment, a lamination process is completed. In this state, the window W, the panel PA, and the top surface US of the pressure pad EP completely overlap each other. In addition, the top surface US of the pressure pad EP includes a flat part at the first surface 10, shown in FIG. 7, and a curved part at the second surface 20, shown in FIG. 7, to correspond to the shape of the window W or the panel PA.

In an embodiment, the first part S1 of the pressure sensor array 100 is pressed against the flat surface FS of the window W, and the second part S2 of the pressure sensor array 100 is completely pressed against the curved surface CS of the window W. While the window W and the panel PA adhere to each other on the pressure pad EP, the pressure sensor array 100 measures different pressures based on position by using the first and second electrodes 110 and 120, shown in FIG. 6A, that differ from each other and are disposed on the first and second parts S1 and S2. For example, the first electrode 110 measures pressure of the flat surface part, and the second electrode 120 measures pressure of the curved surface part.

In an embodiment, the lamination device includes a controller. The controller receives information of measured pressures from the pressure sensor array 100. For example, the controller compares a pressure measured in the first electrode 110 and a pressure measured in the second electrode 120, and then corrects an error when an error with respect to a preset reference value occurs.

In an embodiment, the controller controls movement of the first and second jigs UJ and LJ based on different pressures sensed through the first electrode 110 and the second electrode 120. For example, when the pressure measured in the second electrode 120 differs from the preset reference value, the controller moves the second jig LJ to make the pressure of the second electrode 120 the same as the preset reference value.

Figure 9:
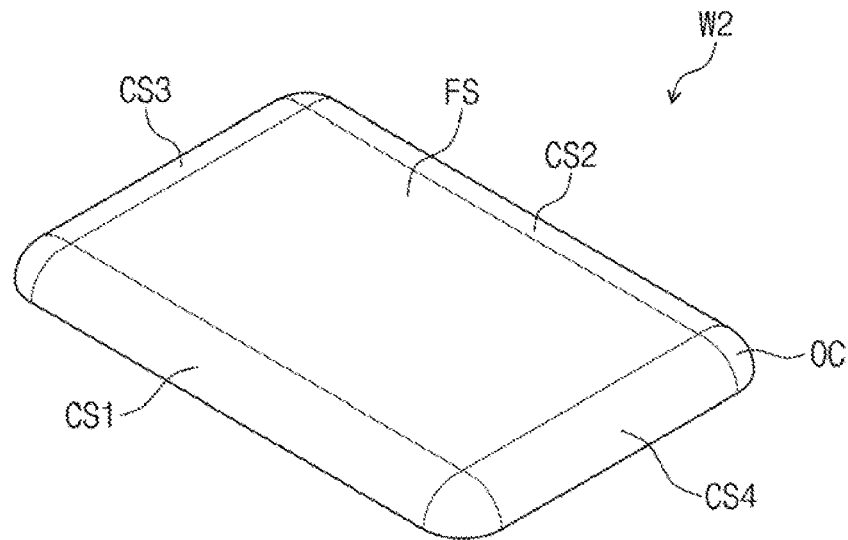
FIG. 9 is a perspective view of a window according to an embodiment of the present disclosure.
Figure 10:
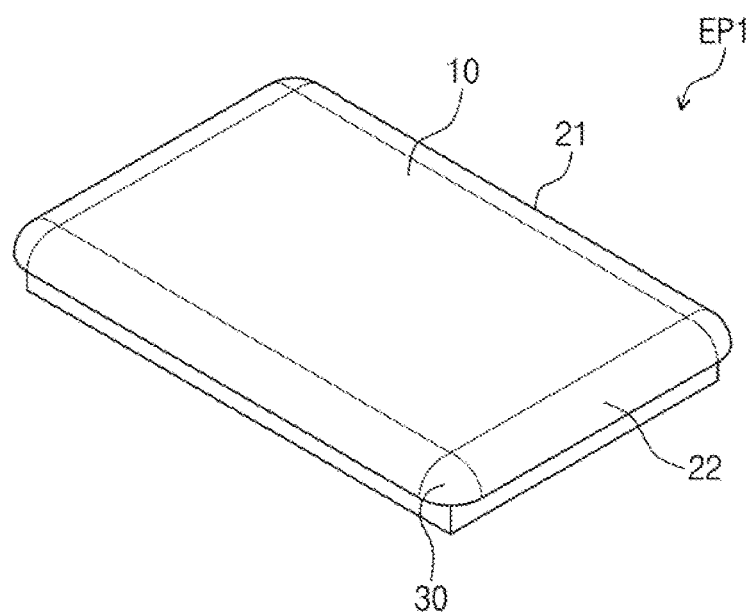
FIG. 10 is a perspective view of a pressure pad according to an embodiment of the present disclosure.

FIG. 9 is a perspective view of a window according to an embodiment of the present disclosure. FIG. 10 is a perspective view of a pressure pad according to an embodiment of the present disclosure.

Referring to FIG. 9, a lamination device according to an embodiment of the present disclosure has a window W2 that includes four curved surfaces. In FIG. 9, the window W2 includes four curved surfaces.

In an embodiment, the window W2 has two curved surfaces CS1 and CS2 on long sides thereof, and the two curved surfaces CS1 and CS2 are substantially the same as those shown in FIG. 1.

Different from an embodiment of FIG. 1, the window W2 has curved surfaces CS3 and CS4 formed on short sides thereof.

In an embodiment, the window W2 further includes one or more connection curved surfaces OC, each of which links a curved surface on the long side to a curved surface on the short side. For example, the connection curved surface OC has one side in contact with one of the curved surfaces CS1 or CS2 formed on the long side of the window W2, and another side in contact with one of the curved surfaces CS3 or CS4 formed on the short side of the window W2.

In an embodiment, the window W2 includes four connection curved surfaces OC. However, embodiments are not limited thereto, and in another embodiment, the number of the connection curved surfaces OC may be less than or greater than four.

Referring to FIG. 10, a pressure pad EP1 according to an embodiment includes four curved surface parts formed on a top surface thereof. The pressure pad EP1 includes a flat first surface 10 and a plurality of curved surface parts that surround the flat first surface 10. The pressure pad EP1 includes a second surface 21 on a long side thereof and a third surface 22 on a short side thereof. A fourth surface 30 links the second surface 21 to the third surface 22.

FIGS. 11A, 11B, 12, and 13 are plan views of a pressure sensor array according to an embodiment of the present disclosure. Each of pressure sensor arrays 100-2, 100-3, and 100-4 depicted in FIGS. 11A, 12, and 13 can be disposed between the window W of FIG. 9 and the pressure pad EP1 of FIG. 10. The arrangement of the pressure sensor array 100 depicted in FIGS. 1 and 2 is identical or substantially similar to that of the pressure sensor arrays 100-2, 100-3, and 100-4.

Figure 11A:
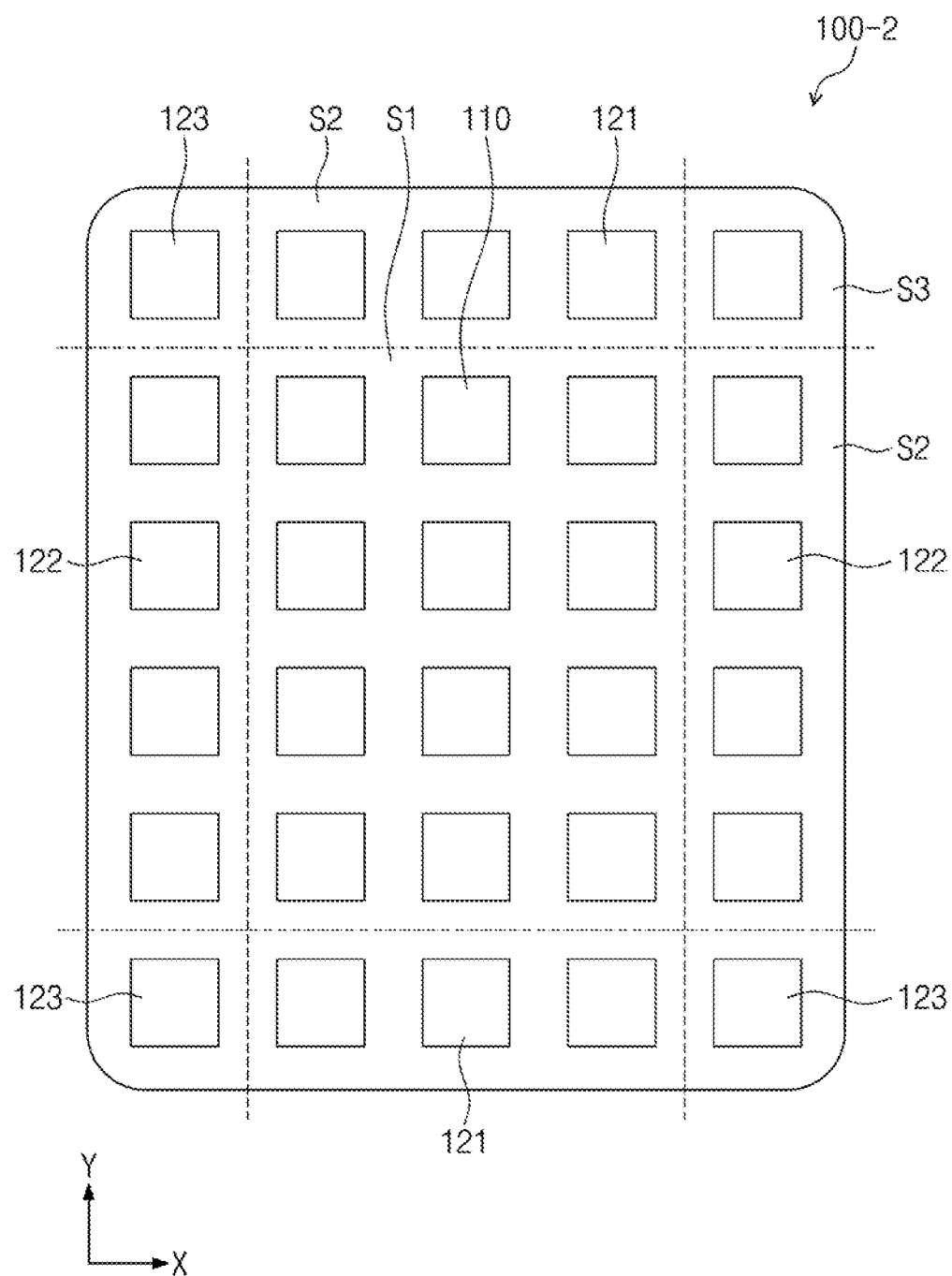
FIGS. 11A, 11B, 12, and 13 are plan views of a pressure sensor array according to an embodiment of the present disclosure.

Referring to FIG. 11A, in an embodiment, the pressure sensor array 100-2 includes a first electrode 110, a second electrode 121, a third electrode 122, and a fourth electrode 123. The first electrode 110 is disposed on a flat first surface part S1. The second electrode 121 and the third electrode 122 are disposed on a curved second surface part S2. The second electrode 121 is disposed on a short side second part S2 that extends in the x-axis direction. The third electrode 122 is disposed on a long side second part S2 that extends in the y-axis direction. The fourth electrode 123 is disposed on a third part S3. The third part S3 corresponds to a location that links short and long sides of the second part S2.

In an embodiment, the first, second, third, and fourth electrodes 110, 121, 122, and 123 are all disposed at different positions from each other, and can distinguish and measure different pressures from each other. The first, second, third, and fourth electrodes 110, 121, 122, and 123 have different moduli and/or sizes from each other. For example, the first electrode 110 has a modulus less than that of each of the second, third, and fourth electrodes 121, 122, and 123. The modulus of the fourth electrode 123 is less than that of the second electrode 121. The second electrode 121 has a size or width that is less than that of the fourth electrode 123.

In an embodiment, the first, second, third, and fourth electrodes 110, 121, 122, and 123 are provided as different types of sensors. For example, the first electrode 110 includes a piezo-resistive type sensor, the second electrode 121 includes a piezo-capacitive type sensor, and the third and fourth electrodes 122 and 123 include a transistor type sensor.

Figure 11B:
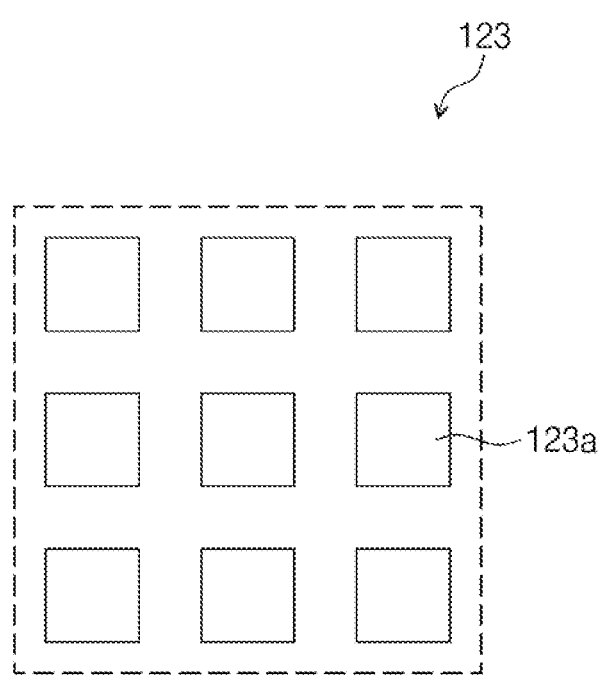

Referring to FIG. 11B, in an embodiment, each of a plurality of fourth electrodes 123 includes a plurality of fine electrodes 123a. For example, each of the fourth electrodes 123 is provided as a plurality of fine electrodes 123a. Each of the plurality of fine electrodes 123a is a sensor that includes one of a piezo-resistive type sensor, a piezo-capacitive type sensor, or any other type of sensor described with reference to FIGS. 6A to 6G. The plurality of fine electrodes 123a may be commonly provided as the same type of sensor, but embodiments of the present disclosure are not limited thereto. As each of the fourth electrodes 123 includes a plurality of fine electrodes 123a that are disposed on the third part S3 or a corner of the pressure sensor array 100-2 and are placed at different positions from each other, each of the fourth electrodes 123 can precisely detect a pressure applied thereto.

Although FIG. 11B depicts that each of the fourth electrodes 123 includes a plurality of fine electrodes 123a, one or more of the first, second, or third electrodes 110, 121, and 123 may include a plurality of fine electrodes.

Figure 12:
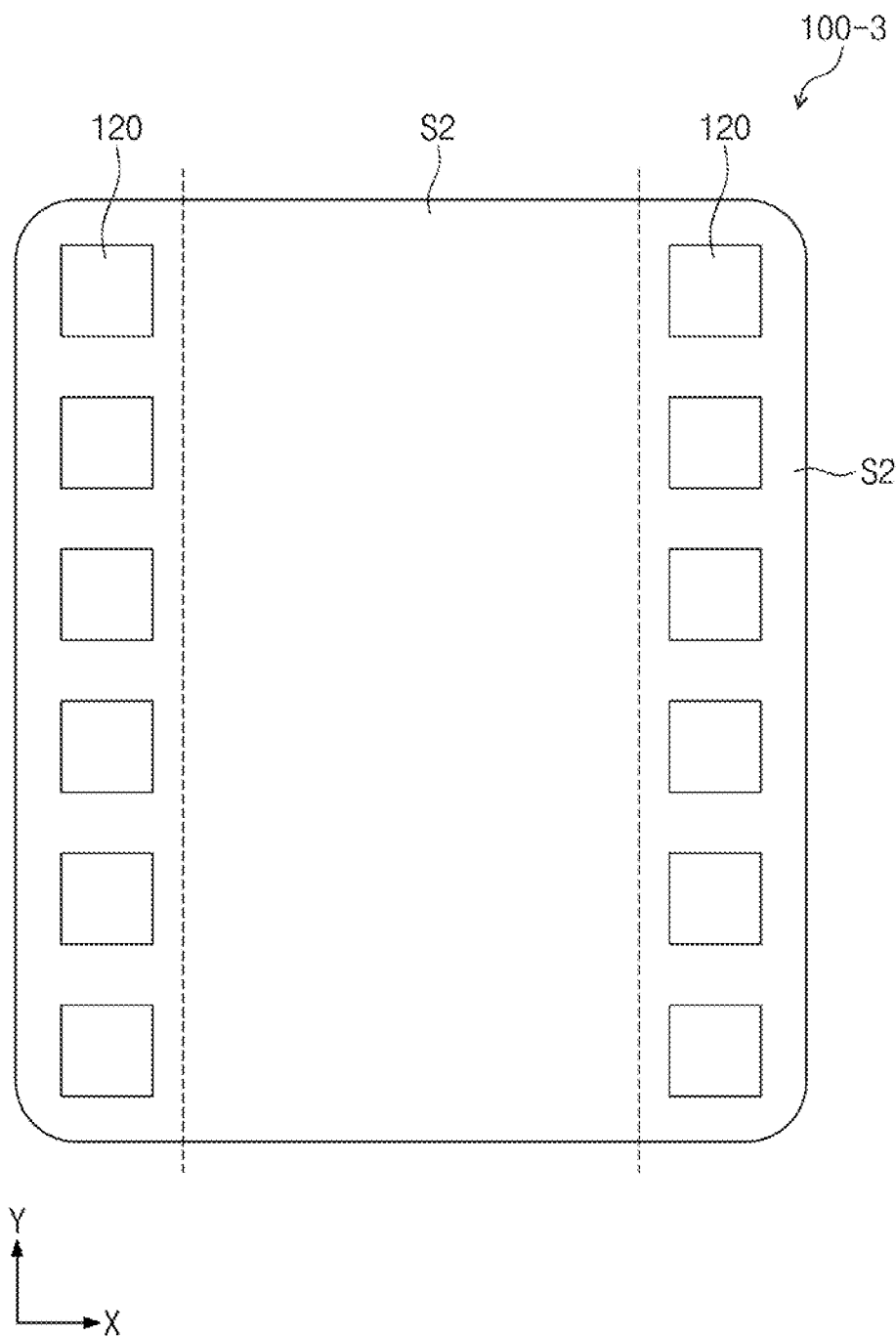
Figure 13:
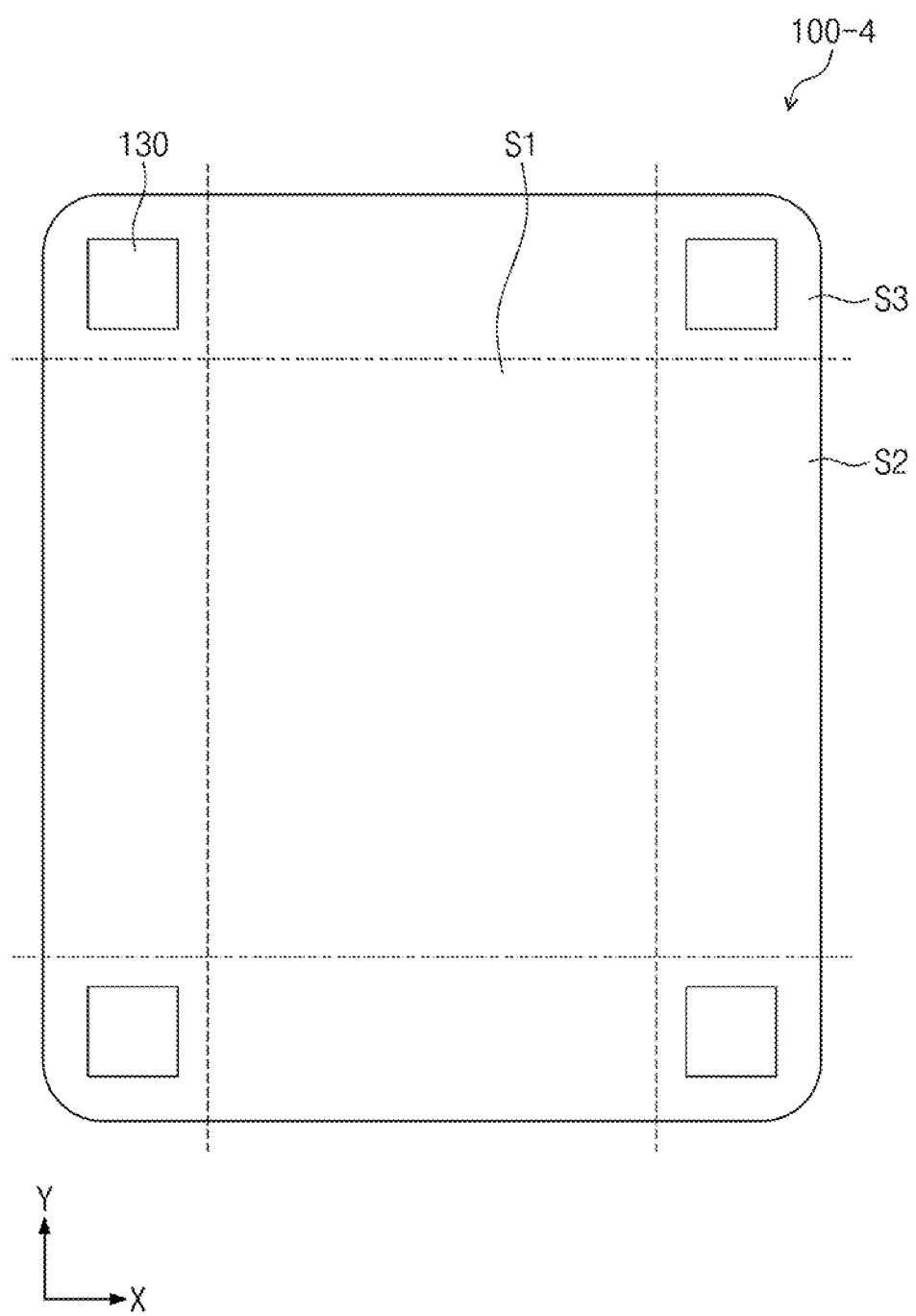

Referring to FIG. 12, the pressure sensor array 100-3 according to an embodiment includes electrodes disposed only on a curved second surface part S2. Second electrodes 120 are disposed on the second part S2. Referring to FIG. 13, the pressure sensor array 100-4 according to an embodiment includes an electrode only on a third part S3 that links second parts S2 to each other. For example, the pressure sensor array 100-4 includes a third electrode 130 on the third part S3. As described above, the pressure sensor arrays 100-3 and 100-4 according to an embodiment include an electrode only on a portion of the curved surface part.

Figure 14:
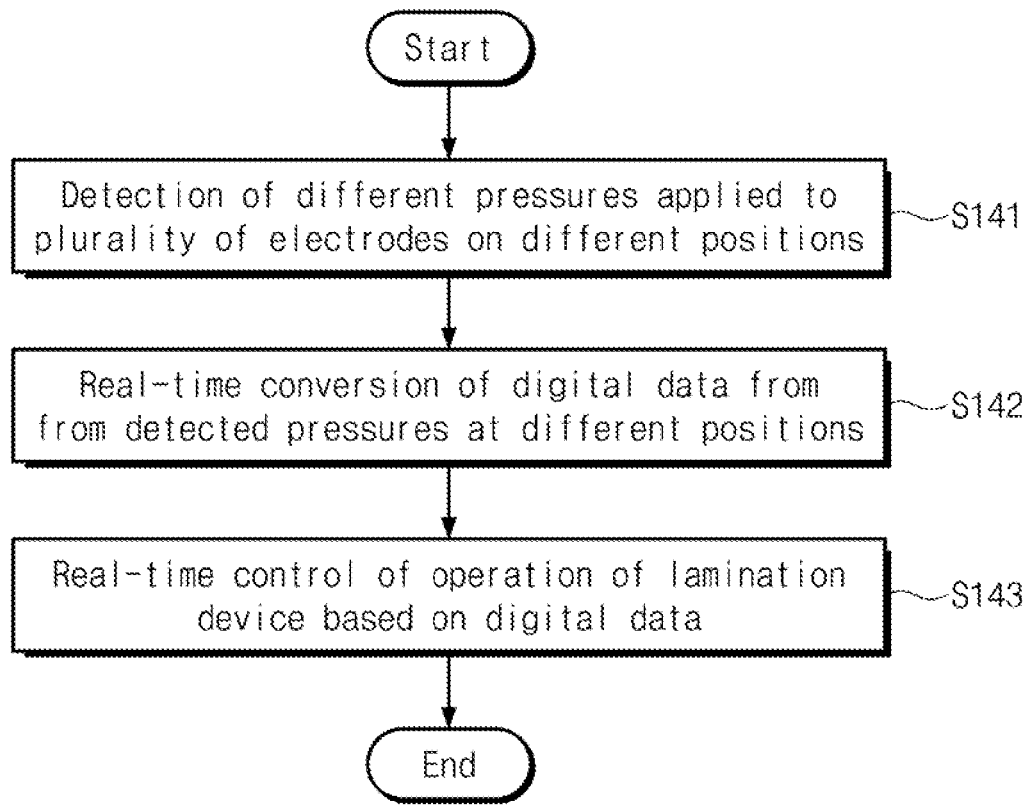
FIG. 14 is a flow chart of an operation of a lamination device according to an embodiment of the present disclosure.

FIG. 14 is a flow chart of an operation of a lamination device according to an embodiment of the present disclosure.

Referring to FIG. 14, in an embodiment, a plurality of electrodes detect different pressures applied to different positions at which the plurality of electrodes are disposed (step S141).

In an embodiment, a controller converts the detected pressures into digital data in real-time (step S142). The controller collects the digital data received in real-time and uses artificial intelligence to analyze the received digital data.

In an embodiment, the controller controls in real-time the operation of a lamination device based on the converted digital data (step S143). In an embodiment, based on the digital data, the controller controls movement of a first jig or a second jig. The controller controls an overall operation of the lamination device based on the digital data related to pressures applied to different positions on a pressure pad. For example, based on information analyzed with artificial intelligence, the controller can precisely adjust different pressures applied to the pressure pad.

Figure 15:
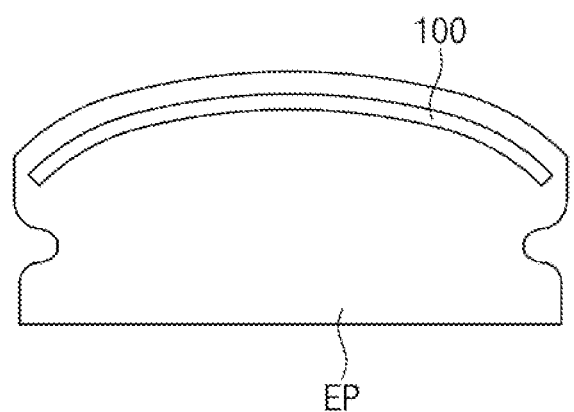
FIG. 15 is a cross-sectional view of a pressure pad and a pressure sensor array of a lamination device according to another embodiment of the present disclosure.

FIG. 15 is a cross-sectional view of a pressure pad and a pressure sensor array of a lamination device according to an embodiment of the present disclosure.

In a present embodiment, the pressure sensor array 100 is disposed within the pressure pad EP. For example, the pressure sensor array 100 is embedded in the pressure pad EP with no separate adhesive member. The pressure sensor array 100 is fixed within the pressure pad EP, and can measure different pressures that are applied from an upside of the pressure pad EP to positions on the pressure sensor array 100.

A lamination device according to an embodiment of the present disclosure includes a pressure sensor array to distinguish and measure pressures based on position.

Some embodiments have been described in the specification and drawings. Although specific terms are used herein, they are merely used for the purpose of describing embodiments of the present disclosure rather than limiting technical meanings or scopes of the present disclosure disclosed in the claims. Therefore, it will be appreciated by a person of ordinary skill in the art that various modifications and equivalent embodiments can be made from embodiments of the present disclosure. In conclusion, the authentic technical scope of embodiments of the present disclosure to be protected shall be determined by the technical concepts of the accompanying claims.

What is claimed is:

1. A lamination device, comprising:
   a first jig to which is fixed a window wherein the window includes a flat surface and at least one curved surface;
   a pressure pad disposed on a second jig that faces the first jig, wherein the pressure pad includes a first surface that overlaps the flat surface of the window and a second surface that overlaps the at least one curved surface of the window; and
   a pressure sensor array disposed on the pressure pad, wherein the pressure sensor array includes:
      a plurality of first electrodes that overlap the first surface; and
      a plurality of second electrodes that overlap the second surface; and
      a first stretchable substrate,
      wherein the first electrodes and the second electrodes are disposed on one surface of the stretchable substrate.

2. The lamination device of claim 1, further comprising a panel interposed between the window and the pressure pad.

3. The lamination device of claim 1, wherein the pressure pad includes:
   a top surface that is convex toward the window; and
   a depression that is inwardly recessed from a lateral surface of the pressure pad,
   wherein the first and second surfaces of the pressure pad are located on the top surface of the pressure pad.

4. The lamination device of claim 1, wherein the stretchable substrate includes a polymer thin film.

5. The lamination device of claim 1, further comprising an adhesive member interposed between the stretchable substrate and the pressure pad.

6. The lamination device of claim 1, wherein the pressure sensor array further includes a support substrate disposed on the one surface of the stretchable substrate, wherein the support substrate covers the first electrodes and the second electrodes,
wherein the support substrate includes a same material as that of the pressure pad.

7. The lamination device of claim 1, wherein an elastic modulus of the second electrodes is less than an elastic modulus of the first electrodes.

8. The lamination device of claim 1, wherein a size of each of the first electrodes differs from a size of each of the second electrodes.

9. The lamination device of claim 1, wherein the pressure sensor array further includes a second stretchable substrate disposed on the first stretchable substrate,
wherein the first electrodes and the second electrodes are disposed between the first stretchable substrate and the second stretchable substrate.

10. A lamination device, comprising:
a first jig to which is fixed a window that includes a curved surface;
a second jig that faces the first jig, Wherein the second jig includes a pressure pad and the pressure pad includes a top surface that overlaps the window; and
a pressure sensor array disposed on a portion of the pressure pad that overlaps the curved surface of the window, wherein the pressure sensor array includes a plurality of electrodes,
wherein the pressure sensor array includes a stretchable substrate,
wherein the first electrode and the second electrode are disposed on the stretchable substrate.

11. The lamination device of claim 10, wherein the curved surface includes a first curved surface and a second curved surface,
wherein the pressure sensor array includes:
a first electrode that overlaps the first curved surface; and
a second electrode that overlaps the second curved surface.

12. The lamination device of claim 10, wherein the pressure sensor array further includes a support substrate disposed on the stretchable substrate,
wherein a thickness of the support substrate is greater than a thickness of the stretchable substrate.

13. The lamination device of claim 10, wherein the stretchable substrate includes a polymer thin film.

14. The lamination device of claim 10, wherein the plurality of electrodes are disposed at different positions and detect pressures whose magnitudes differ from each other.

15. A lamination device, comprising:
a first jig to which a window is fixed;
a pressure pad disposed on a second jig, wherein the second jig faces the first jig; and
a pressure sensor array attached to a top surface of the pressure pad,
wherein the pressure sensor array includes
a plurality of electrodes disposed at different positions on the top surface of the pressure pad, and
a stretchable substrate disposed below the plurality of electrodes,
wherein the plurality of electrodes detect different pressures applied to the different positions.

16. The lamination device of claim 15, wherein the window includes a flat surface and a curved surface that surrounds the flat surface,
wherein the plurality of electrodes include a plurality of first electrodes that overlap the flat surface and a plurality of second electrodes that overlap the curved surface.

17. The lamination device of claim 16, wherein an elastic modulus of the second electrodes is less than an elastic modulus of the first electrodes.

18. The lamination device of claim 16, further comprising a controller that controls in real-time the different pressures applied to the pressure pad, based on the detected different pressures.

19. The lamination device of claim 18, wherein the controller controls a movement of the first jig or the second jig, based on the detected different pressures.

20. A method of operating of a lamination device, comprising the steps of:
detecting, by a plurality of electrodes of a pressure sensor array that are disposed at different positions on a pressure pad of the lamination device, different pressures applied to the plurality of electrodes;
converting, by a controller, the detected different pressures into digital data in real-time, and analyzing the digital data using artificial intelligence; and
controlling, by the controller, an operation of a lamination device in real-time based on the digital data related to the detected different pressures, wherein the controller controls movement of a first jig or a second jig of the lamination device and adjusts the different pressures applied to the pressure pad,
wherein the pressure sensor array further includes;
a stretchable substrate disposed below the plurality of electrodes.

* * * * *